(12) United States Patent
Fatin Farhanah et al.

(10) Patent No.: US 12,169,137 B2
(45) Date of Patent: Dec. 17, 2024

(54) AIRFLOW AMOUNT MEASURING DEVICE

(71) Applicant: Hitachi Astemo, Ltd., Hitachinaka (JP)

(72) Inventors: Binti Haridan Fatin Farhanah, Hitachinaka (JP); Hiroyuki Abe, Hitachinaka (JP); Takayuki Yogo, Hitachinaka (JP); Nozomi Yatsumonji, Hitachinaka (JP); Mizuki Ijuin, Hitachinaka (JP)

(73) Assignee: Hitachi Astemo, Ltd., Hitachinaka (JP)

( * ) Notice: Subject to any disclaimer, the term of this patent is extended or adjusted under 35 U.S.C. 154(b) by 147 days.

(21) Appl. No.: 17/801,620

(22) PCT Filed: Dec. 25, 2020

(86) PCT No.: PCT/JP2020/048699
§ 371 (c)(1),
(2) Date: Aug. 23, 2022

(87) PCT Pub. No.: WO2021/181827
PCT Pub. Date: Sep. 16, 2021

(65) Prior Publication Data
US 2023/0079532 A1 Mar. 16, 2023

(30) Foreign Application Priority Data
Mar. 10, 2020 (JP) .................................. 2020-040656

(51) Int. Cl.
*G01F 1/692* (2006.01)
(52) U.S. Cl.
CPC .................................. *G01F 1/692* (2013.01)

(58) Field of Classification Search
CPC ................................................ G01F 1/68–699
See application file for complete search history.

(56) References Cited

U.S. PATENT DOCUMENTS

| 8,057,882 | B2 * | 11/2011 | Hirano | ................ B81C 1/00666 |
| | | | | 428/157 |
| 9,523,595 | B2 * | 12/2016 | Ishitsuka | .................. G01F 1/692 |
| 9,658,094 | B2 * | 5/2017 | Tokuyasu | ................ G01F 1/692 |
| 11,512,991 | B2 * | 11/2022 | Abo | ....................... G01F 1/6847 |
| 2015/0177043 | A1 | 6/2015 | Tokuyasu et al. | |

FOREIGN PATENT DOCUMENTS

| JP | 2013-120103 A | 6/2013 |
| JP | 5743871 B2 | 5/2015 |
| JP | 2020034508 A | * 3/2020 |

* cited by examiner

*Primary Examiner* — Justin N Olamit
(74) *Attorney, Agent, or Firm* — Volpe Koenig

(57) ABSTRACT

To provide an airflow amount measuring device capable of accurately measuring a flow amount of air without occurrence of warpage in a thin film portion when an airflow measuring element is mounted on a lead frame to form a resin-sealed package in which the airflow amount measuring element and the lead frame are sealed. A chip package includes a lead frame, an element mounted on the lead frame and having a detection portion, and a structure for sealing the lead frame and the element such that at least the detection portion is exposed. Then, the curvature radius ρ of the exposed portion of the element exposed from the sealing resin member is 2.13 or less.

5 Claims, 14 Drawing Sheets

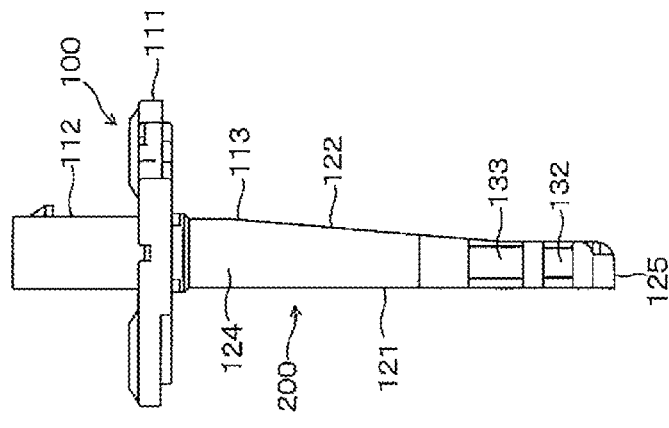
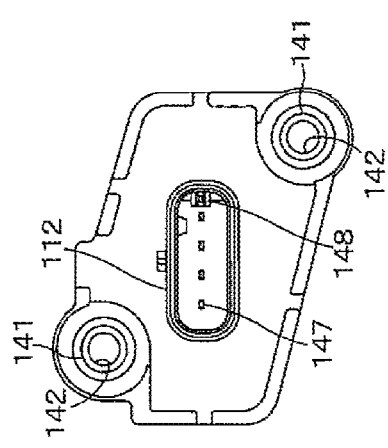
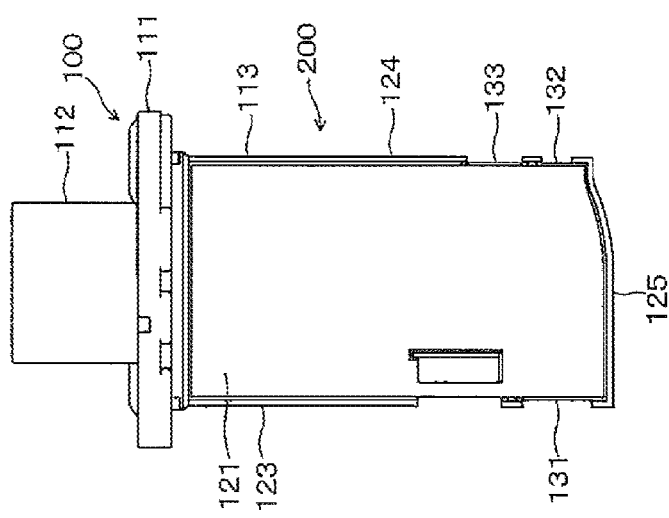
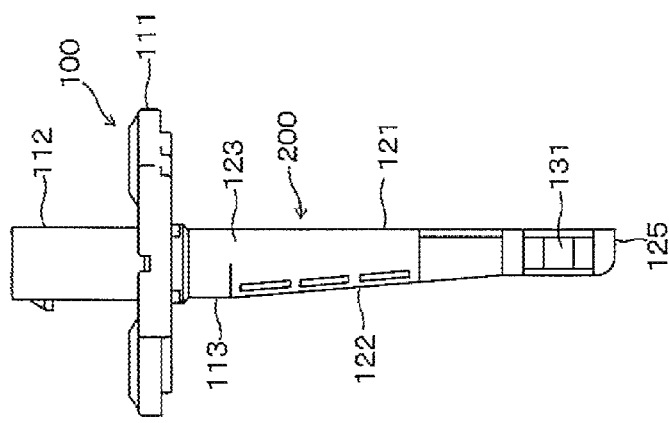

*FIG. 6A*

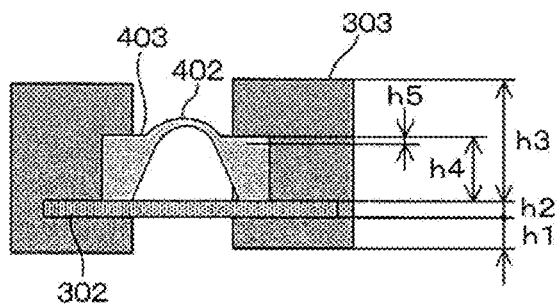

*FIG. 6B*

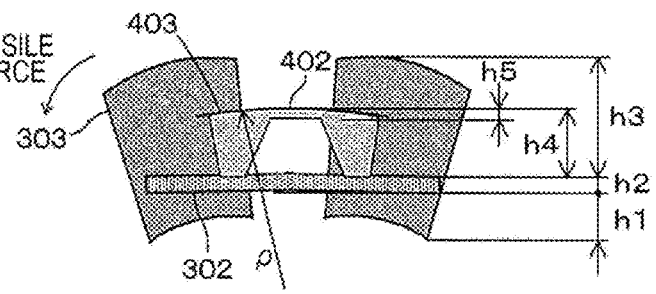

*FIG. 6C*

| ITEM | SYMBOL |
|---|---|
| CURVATURE RADIUS | $\rho$ |
| BENDING MOMENT | $M$ |
| YOUNG'S MODULUS | $E$ |
| CROSS-SECTIONAL SECONDARY MOMENT | $I$ |
| LINEAR EXPANSION COEFFICIENT | $\alpha$ |
| TEMPERATURE CHANGE | $\Delta T$ |
| THICKNESS OF LOWER RESIN S | $h1$ |
| THICKNESS OF LEAD FRAME 302 | $h2$ |
| THICKNESS OF UPPER RESIN U | $h3$ |
| THICKNESS OF ELEMENT 301 | $h4$ |
| THICKNESS OF THIN FILM PORTION 402 | $h5$ |
| CURING CONTRACTION RATE OF PACKAGE 303 | $\beta$ |
| COMPOSITE THICKNESS $\dfrac{h1+h2+h3+h4+h5}{h1^3+h2^3+h3^3+h4^3+h5^3}$ | $\gamma$ |

FIG. 10A
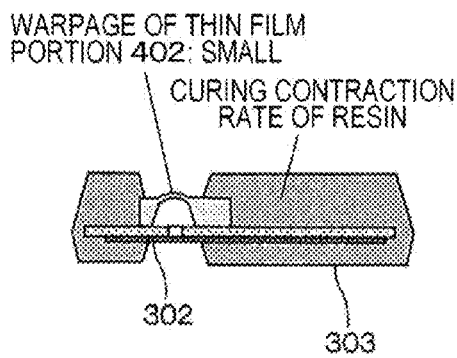
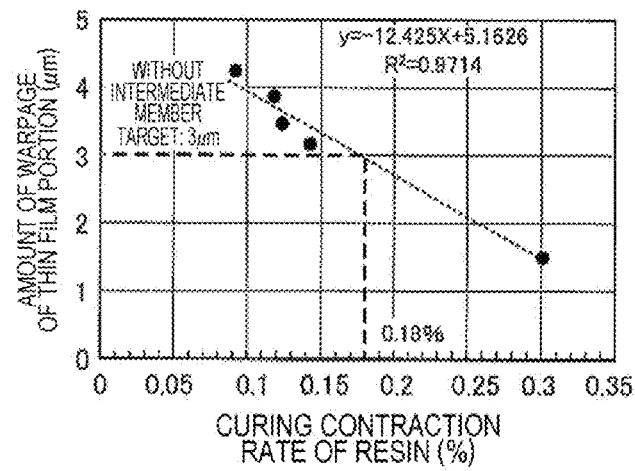
FIG. 10B
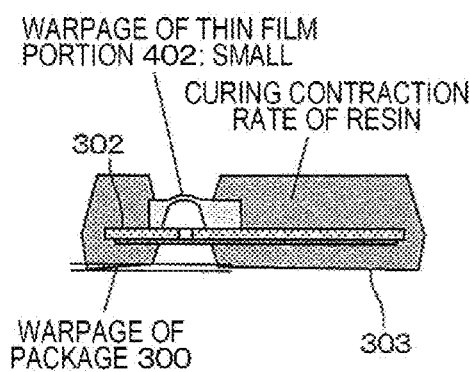
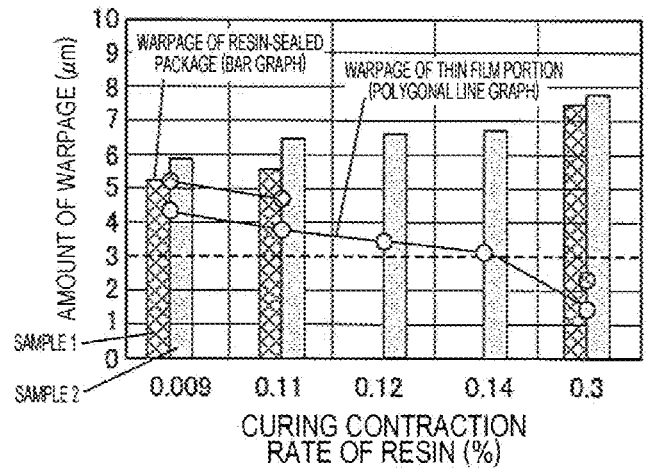

FIG. 12

| ITEM | SYMBOL | A | B | C | D | E |
|---|---|---|---|---|---|---|
| THICKNESS OF LOWER RESIN S | h1 | 0.65 | ← | ← | ← | ← |
| THICKNESS OF LEAD FRAME 302 | h2 | 0.15 | ← | ← | ← | ← |
| THICKNESS OF UPPER RESIN U | h3 | 1.525 | ← | ← | ← | ← |
| THICKNESS OF ELEMENT 301 | h4 | 0.4 | ← | ← | ← | ← |
| THICKNESS OF THIN FILM PORTION 402 | h5 | 0.0005 | 0.001 | 0.002 | 0.0047 | 0.008 |
| CURING CONTRACTION RATE OF SEALING RESIN MEMBER 303 | $\beta$ | 0.3 | ← | ← | ← | ← |
| CURVATURE | $\frac{1}{\rho}$ | 0.461 | 0.477 | 0.491 | 0.505 | 0.509 |
| CURVATURE RADIUS | $\rho$ | 2.168 | 2.095 | 2.037 | 1.980 | 1.983 |

FIG. 13
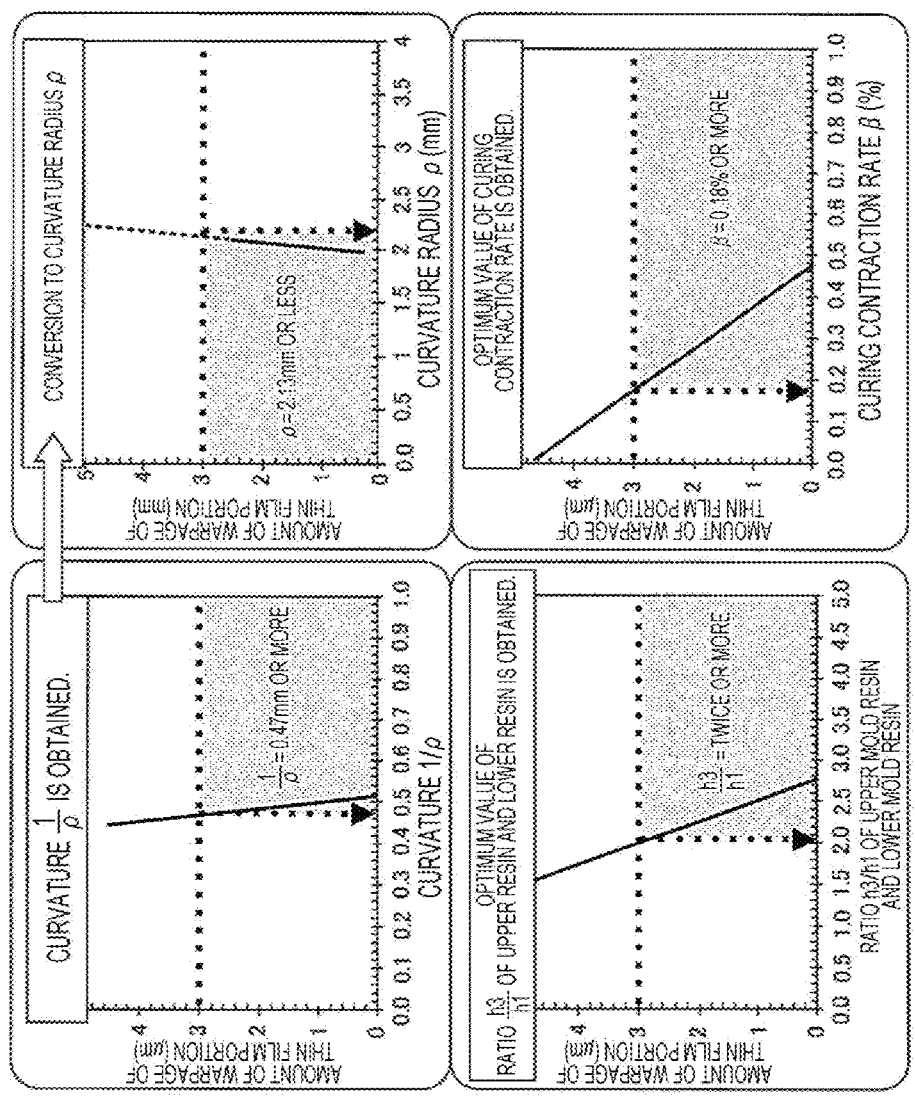
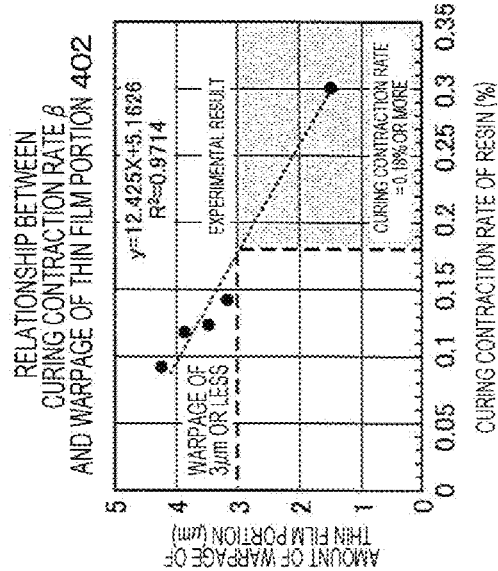

AIRFLOW AMOUNT MEASURING DEVICE

TECHNICAL FIELD

The present invention relates to an airflow amount measuring device that measures a flow amount of air sucked into, for example, an internal combustion engine of an automobile.

BACKGROUND ART

As such an airflow amount measuring device, for example, there is a technique described in PTL 1.

CITATION LIST

Patent Literature

PTL 1: JP 2013-120103 A

SUMMARY OF INVENTION

Technical Problem

In the airflow amount measuring device described in PTL 1, a linear expansion coefficient is different between an airflow amount measuring element and a lead frame on which the airflow amount measuring element is mounted, and thus there is a problem that when the airflow amount measuring element and the lead frame are sealed with a synthetic resin to form a resin-sealed package, stress due to thermal contraction of the synthetic resin may act on a thin film portion which is a thin film portion, and the thin film portion may be warped in a direction protruding from a cavity portion. When the warpage occurs in the thin film portion, there is a problem that it is difficult to accurately measure the flow amount of air.

On the other hand, in a case where an intermediate member such as a glass plate or a silicon plate having a linear expansion coefficient close to that of the airflow measuring element is provided between the airflow amount measuring element and the lead frame in order to alleviate the warpage of the thin film portion, there is a problem that an increase in the number of components and the number of assembling steps causes an increase in the cost of the airflow amount measuring device and an increase in the thickness of the intermediate member.

The present invention has been made to solve such a problem, and an object of the present invention is to provide an airflow amount measuring device capable of suppressing occurrence of warpage in a thin film portion and accurately measuring a flow amount of air in a case where an airflow measuring element is mounted on a lead frame to form a resin-sealed package in which the airflow amount measuring element and the lead frame are sealed.

Solution to Problem

An airflow amount measuring device according to the present invention includes a resin-sealed package including a lead frame, an airflow amount measuring element mounted on the lead frame and having a detection portion, and a sealing resin member which seals the lead frame and the airflow amount measuring element such that at least the detection portion is exposed, in which a curvature radius ρ of an exposed portion of the airflow amount measuring element exposed from the sealing resin member is 2.13 or less.

Advantageous Effects of Invention

According to the present invention, it is possible to provide the airflow amount measuring device capable of suppressing occurrence of warpage in a thin film portion and accurately measuring a flow amount of air in a case where the airflow measuring element is mounted on the lead frame to form the resin-sealed package in which the airflow amount measuring element and the lead frame are sealed.

Further features related to the present invention will become apparent from the description of the present description and the accompanying drawings. In addition, problems, configurations, and effects other than those described above will become apparent from the description of the following embodiment.

BRIEF DESCRIPTION OF DRAWINGS

FIGS. 2A-2D are a view for explaining a configuration of the airflow amount measuring device, in which FIG. 2A is a top view, FIGS. 2B and 2D are side views, and FIG. 2C is a front view.

FIGS. 4A-4B are a view for explaining a configuration of a resin-sealed package, in which FIG. 4A is a perspective view, and FIG. 4B is a cross-sectional view taken along line A-A of FIG. 4A.

FIGS. 6A-6C are an explanatory diagram for explaining a mechanism of a bending stress of the package, in which FIG. 6A illustrates a cross-sectional view of an element in which a thin film portion is in a convex state, FIG. 6B is a cross-sectional view of the element in which the thin film portion is in a concave state, and FIG. 6C is a table showing each symbol of a calculation formula for explaining the mechanism.

FIGS. 8A-D are a view for explaining the amount of warpage of the thin film portion, in which FIG. 8A is a view schematically illustrating a cross section of the resin-sealed package, FIG. 8B is a perspective view of the resin-sealed package, FIG. 8C is a view schematically illustrating a cross section of the thin film portion, and FIG. 8D is an explanatory diagram for explaining measurement in a vertical direction and a lateral direction of the element.

FIGS. 10A-10B are a graph showing a relationship between a curing contraction rate of a resin and the amount of warpage, in which FIG. 10A is a graph showing a relationship between the curing contraction rate of the resin and the amount of warpage of the thin film portion, and FIG. 10B is a graph showing a relationship between the curing contraction rate of the resin, and the amount of warpage of a package and the amount of warpage of the thin film portion.

FIGS. 11A-11B are an explanatory diagram for explaining the amount of warpage according to the curing contraction rate of the resin-sealed package, in which FIG. 11A is a view illustrating a case where the curing contraction rate is 0.09%, and FIG. 11B is a view illustrating a case where the curing contraction rate is 0.3%.

FIG. 12 is an explanatory diagram for explaining each item and symbol of the resin-sealed package and a plurality of different thicknesses of the thin film portion for each item.

FIG. 13 is a graph showing the relationship between the curing contraction rate of the resin and the amount of warpage of the thin film portion, a relationship between a curvature and the amount of warpage of the thin film portion, a relationship between a curvature radius and the amount of warpage of the thin film portion, and a relationship between a ratio of an upper resin and a lower resin and the amount of warpage of the thin film portion.

DESCRIPTION OF EMBODIMENTS

A mode for carrying out the invention (hereinafter, an embodiment) described below solves various problems requested to solve in an actual product, and solves various problems required to solve particularly for use as an airflow amount measuring device for measuring a flow amount of air, and exhibits various effects. One of the various problems solved by the following embodiment is the content described in the section of "Technical Problem" described above, and one of the various effects achieved by the following embodiment is the effect described in the section of "Advantageous Effects of Invention". Various problems solved by the following embodiment and various effects achieved by the following embodiment will be described in the following description of the embodiment. Therefore, the problems solved by the embodiment and effects described in the following embodiment are also described for contents other than the contents in the section of "Technical Problem" and the section of "Advantageous Effects of Invention".

In the following embodiment, the same reference sign indicates the same configuration even if the figure numbers are different, and the same function and effect are obtained. For the already described configuration, only reference signs are given to the drawings, and description thereof may be omitted.

Figure 1:
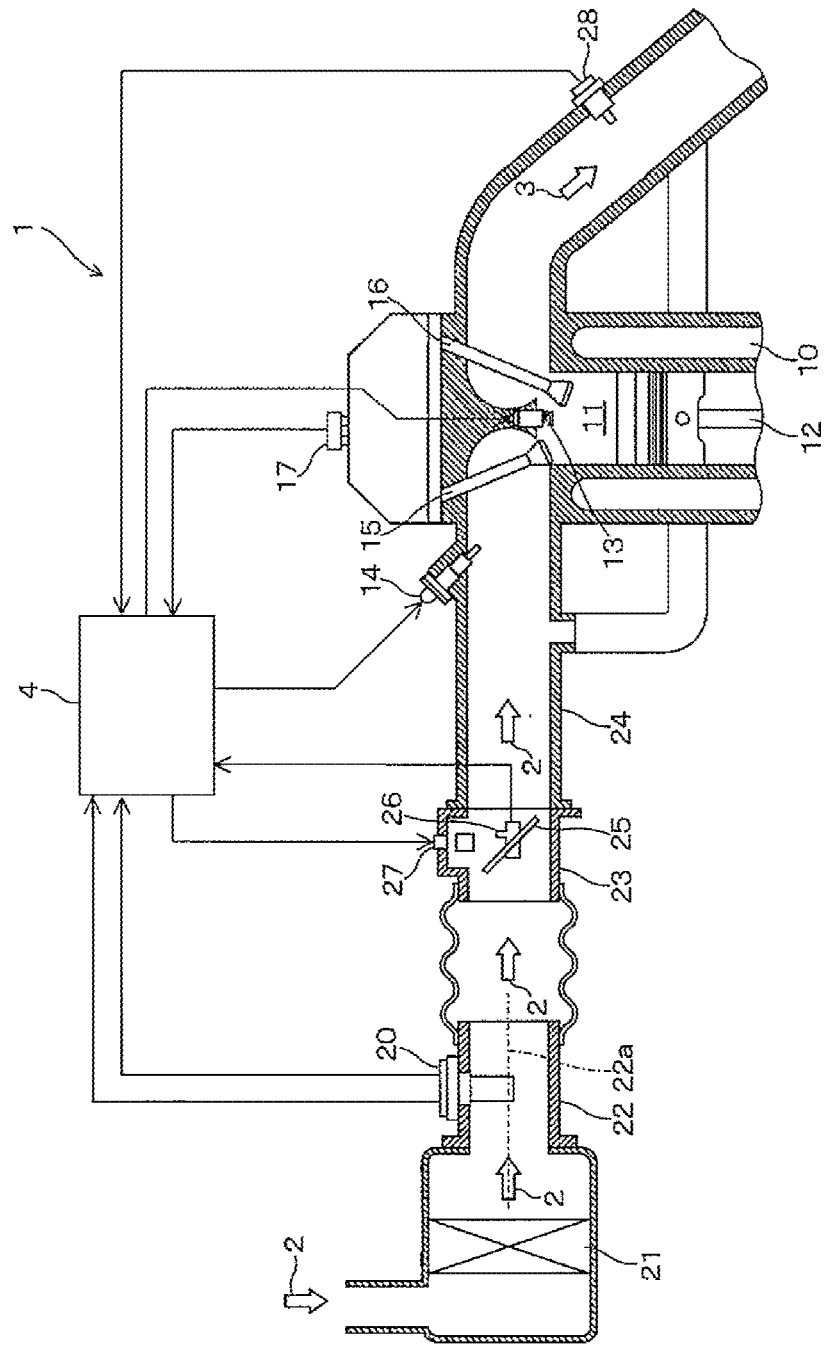
FIG. 1 is a configuration diagram of an internal combustion engine in which an airflow amount measuring device is used.

An airflow amount measuring device 20 according to the embodiment in which the airflow amount measuring device according to the present invention is applied to an electronic fuel injection type internal combustion engine control system 1 will be described with reference to the drawings. In the internal combustion engine control system 1, as illustrated in FIG. 1, an intake air 2 is sucked in from an air cleaner 21 on the basis of the operation of an internal combustion engine 10 including an engine cylinder 11 and an engine piston 12, and is guided to a combustion chamber of the engine cylinder 11 via an intake body 22 having a main passage 22a, a throttle body 23, and an intake manifold 24. The flow amount of the intake air 2 guided to the combustion chamber is detected by the airflow amount measuring device 20 according to the present invention, and a fuel is supplied from a fuel injection valve 14 on the basis of the detected flow amount and is guided with the intake air 2 to the combustion chamber in an air-fuel mixture state. Note that in the present embodiment, the fuel injection valve 14 is provided in the intake port of the internal combustion engine, and the fuel injected into the intake port forms the air-fuel mixture together with the intake air 2, is guided to the combustion chamber via an intake valve 15, and combusts to generate a mechanical energy.

The fuel and the intake air 2 guided to the combustion chamber are in a mixed state of the fuel and the intake air 2, and combust explosively by spark ignition of an ignition plug 13 to generate a mechanical energy. The gas after the combustion is guided from an exhaust valve 16 to an exhaust pipe, and is discharged as an exhaust gas 3 from the exhaust pipe to the outside of a vehicle. The flow amount of the intake air 2 guided to the combustion chamber is controlled by a throttle valve 25 of which the opening degree changes on the basis of the operation of an accelerator pedal. A fuel supply amount is controlled on the basis of the flow amount of the intake air guided to the combustion chamber, and a driver can control the mechanical energy generated by the internal combustion engine by controlling the opening degree of the throttle valve 25 to control the flow amount of the intake air guided to the combustion chamber.

The flow amount, temperature, humidity, and pressure of the intake air 2 taken in from the air cleaner 21 and flowing through the main passage 22a are detected by the airflow amount measuring device 20, and a signal representing the flow amount of the intake air 2 is transmitted from the airflow amount measuring device 20 to a control device 4. In addition, a signal of a throttle angle sensor 26 which detects the opening degree of the throttle valve 25 is transmitted to the control device 4, and a signal of a rotation angle sensor 17 is transmitted to the control device 4 in order to measure the positions and states of the engine piston 12, the intake valve 15, and the exhaust valve 16 of the internal combustion engine and further the rotation speed of the internal combustion engine. In order to measure the state of the mixing ratio of the fuel amount and the air amount from the state of the exhaust gas 3, a signal of an oxygen sensor 28 is transmitted to the control device 4.

The control device 4 calculates the fuel injection amount and the ignition timing on the basis of the flow amount of the intake air 2 which is the output of the airflow amount measuring device 20 and the rotation speed of the internal combustion engine output and detected by the rotation angle sensor 17. On the basis of these calculation results, the amount of fuel supplied from the fuel injection valve 14 and the ignition timing of ignition by the ignition plug 13 are controlled. The fuel supply amount and the ignition timing are actually finely controlled on the basis of the change state of the temperature or the throttle angle detected by the airflow amount measuring device 20, the change state of the engine rotation speed, and the state of the air-fuel ratio detected by the oxygen sensor 28. The control device 4 further controls the amount of air bypassing the throttle valve 25 by an idle air control valve 27 in the idle operation state of the internal combustion engine, and controls the rotation speed of the internal combustion engine in the idle operation state.

Both the fuel supply amount, which is the main control amount of the internal combustion engine, and the ignition timing are calculated using the output of the airflow amount measuring device 20 as a main parameter. Therefore, the improvement of detection accuracy of the airflow amount measuring device 20, the suppression of temporal change, and the improvement of reliability are important for the improvement of control accuracy of the vehicle and the securement of reliability.

In particular, in recent years, a demand for fuel saving of the vehicle is considerably high, and a demand for exhaust gas purification is considerably high. In order to meet these demands, it is extremely important to improve the measurement accuracy of the flow amount of the intake air detected by the airflow amount measuring device 20. In addition, it is also important that the airflow amount measuring device 20 maintains a high reliability.

The vehicle on which the airflow amount measuring device 20 is mounted is used in an environment where a change in temperature or humidity is large. It is desirable that in the airflow amount measuring device 20, a response to a change in temperature or humidity in the use environment and a response to dust, contaminants, and the like be considered.

The airflow amount measuring device 20 is attached to an intake pipe affected by the heat generated from the internal combustion engine. Therefore, the heat generated by the internal combustion engine is transmitted to the airflow amount measuring device 20 via the intake pipe. Since the airflow amount measuring device 20 measures the flow amount of the intake air 2 by performing heat transfer with the intake air 2, it is important to suppress the influence of heat from the outside as much as possible.

The airflow amount measuring device 20 mounted on the vehicle not only simply solves the problems described in the section of "Technical Problem" and exerts the effects described in the section of "Advantageous Effects of Invention" as described below, but also solves various problems required to solve in a product and exerts various effects in sufficient consideration of the various problems described above. Specific problems to be solved and specific effects to be exerted by the airflow amount measuring device 20 will be described in the following description of the embodiment.

<Overall configuration of airflow amount measuring device> As illustrated in FIGS. 1, 2A, 2B, 2C, and 2D, the airflow amount measuring device 20 includes a housing 100, a cover 200, and a chip package 300. The airflow amount measuring device 20 is used in the state of being inserted into the main passage 22a from an attachment hole provided in a passage wall of the intake body 22 and fixed to the intake body 22.

Figure 3:
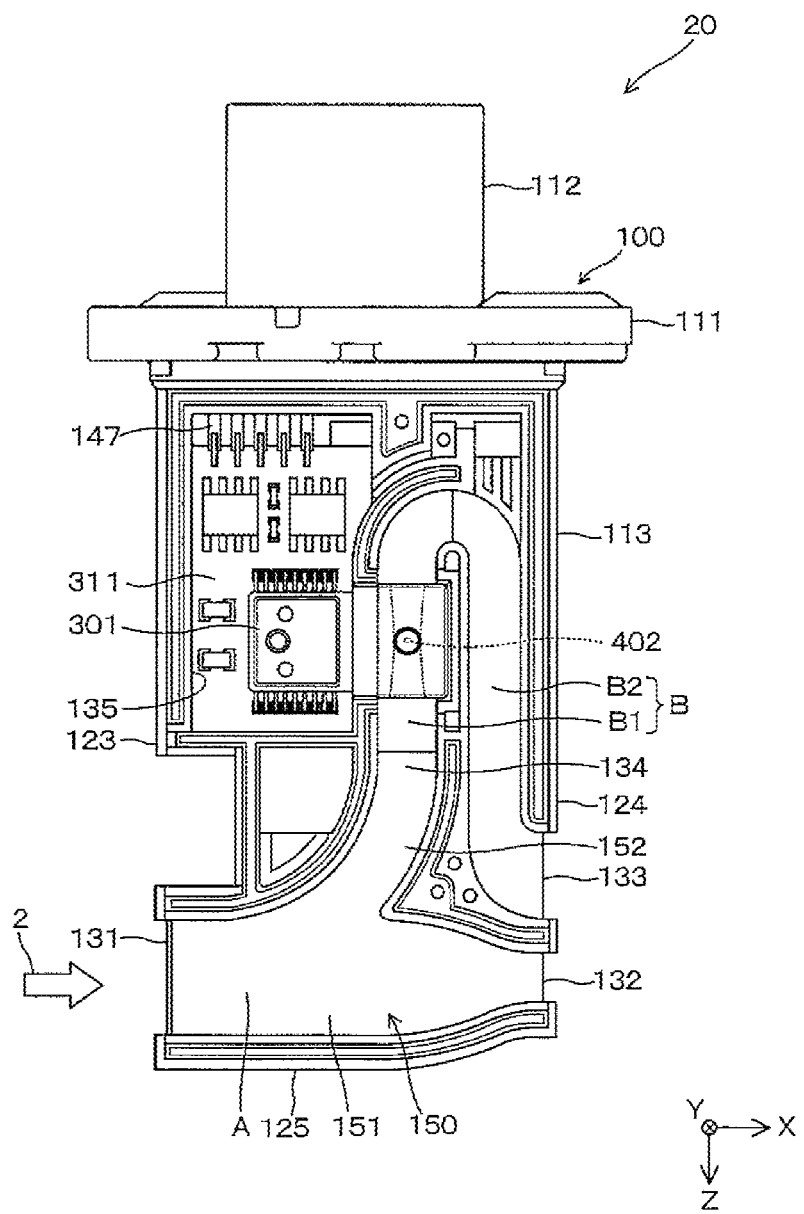
FIG. 3 is a front view of a housing.

As illustrated in FIG. 3, the housing 100 is configured by injection molding a synthetic resin material, for example, and includes a flange 111 for fixing the airflow amount measuring device 20 to the intake body 22, a connector 112 protruding from the flange 111 and exposed to the outside from the intake body 22 to electrical connection with an external device, and a measurement unit 113 extending from the flange 111 to protrude toward the center of the main passage 22a.

As illustrated in FIGS. 2B, 2C, and 2D, the measurement unit 113 has a thin and long shape extending straight from the flange 111, and includes a wide front surface 121 and a wide back surface 122, and a pair of narrow side surfaces 123 and 124. The measurement unit 113 protrudes from the inner wall of the intake body 22 toward the passage center of the main passage 22a in a state where the airflow amount measuring device 20 is attached to the intake body 22. Then, the front surface 121 and the back surface 122 are arranged in parallel along the central axis of the main passage 22a, and in the narrow side surfaces 123 and 124 of the measurement unit 113, the side surface 123 on one longitudinal side of the measurement unit 113 is arranged to face the upstream side of the main passage 22a, and the side surface 124 on the other short side of the measurement unit 113 is arranged to face the downstream side of the main passage 22a. In a state where the airflow amount measuring device 20 is attached to the intake body 22, the distal end portion of the measurement unit 113 is defined as a lower surface 125.

In the measurement unit 113, a sub-passage inlet 131 is provided on the side surface 123, and a first outlet 132 and a second outlet 133 are provided on the side surface 124. The sub-passage inlet 131, the first outlet 132, and the second outlet 133 are provided at the distal end portion of the measurement unit 113 extending from the flange 111 toward the center direction of the main passage 22a. Therefore, the gas in the portion close to the central portion away from the inner wall surface of the intake body 22 can be taken into the sub-passage. Therefore, the airflow amount measuring device 20 can measure the flow amount of the gas in the portion away from the inner wall surface of the intake body 22, and can suppress a decrease in measurement accuracy due to the influence of heat or the like.

The airflow amount measuring device 20 has a shape in which the measurement unit 113 extends long along the axis from the outer wall of the intake body 22 toward the center, but the widths of the side surfaces 123 and 124 are relatively narrow as illustrated in FIG. 2D. As a result, the airflow amount measuring device 20 can suppress a fluid resistance with respect to the intake air 2 to a small value.

The measurement unit 113 is inserted into the intake body 22 through the attachment hole provided in the intake body 22, and the flange 111 abuts on the intake body 22 and is fixed to the intake body 22 with a screw. The flange 111 has a shape which has a predetermined plate thickness and is substantially rectangular in plan view, and as illustrated in FIG. 2A, fixing hole portions 141 are provided in pairs at diagonal corner portions. The fixing hole portion 141 has a through hole 142 penetrating the flange 111. The flange 111 is fixed to the intake body 22 by inserting a fixing screw (not illustrated) into the through hole 142 of the fixing hole portion 141 and screwing the fixing screw into the screw hole of the intake body 22.

As illustrated in FIG. 2A, four external terminals 147 and a correction terminal 148 are provided inside the connector 112. The external terminals 147 are terminals for outputting physical quantities such as a flow amount and a temperature which are measurement results of the airflow amount measuring device 20 and power supply terminals for supplying DC power for operating the airflow amount measuring device 20.

The correction terminal 148 is a terminal used to perform the measurement of the produced airflow amount measuring device 20, obtain a correction value related to each airflow amount measuring device 20, and store the correction value in a memory inside the airflow amount measuring device 20. In the subsequent measurement operation of the airflow amount measuring device 20, correction data representing the correction value stored in the memory is used, and the correction terminal 148 is not used.

Therefore, the correction terminal 148 has a shape different from that of the external terminal 147 so that the correction terminal 148 does not interfere with the connection between the external terminal 147 and another external device. In this embodiment, the correction terminal 148 has a shorter shape than the external terminal 147, and is configured not to obstruct connection even when a connection terminal of an external device connected to the external terminal 147 is inserted into the connector 112.

In the following description, as illustrated in FIG. 3, the longitudinal direction of the measurement unit 113, which is a direction in which the measurement unit 113 extends from the flange 111, may be referred to as a Z axis, a short direction of the measurement unit 113, which is a direction extending from the sub-passage inlet 131 of the measurement unit 113 toward the first outlet 132, may be referred to as an X axis, and a thickness direction of the measurement unit 113, which is a direction from the front surface 121 of the measurement unit 113 toward the back surface 122, may be referred to as a Y axis.

The housing 100 is provided with a sub-passage groove 150 for forming a sub-passage 134 and a circuit chamber 135 for accommodating a circuit board 311. The circuit chamber 135 and the sub-passage groove 150 are formed in the front surface of the measurement unit 113. The circuit chamber 135 is provided in a region on one side (side surface 123 side) in an X-axis direction which is a position on the upstream side in the flow direction of the intake air 2. Then, the sub-passage groove 150 is provided over a region on the leading end side (lower surface 125 side) of the measurement unit 113 in the Z-axis direction with respect to the circuit chamber 135 and a region on the other side in the X-axis direction (side surface 124 side) which is a position on the downstream side in the flow direction of the intake air 2 with respect to the circuit chamber 135.

The sub-passage groove 150 is covered by the cover 200 to form the sub-passage 134. The sub-passage groove 150 includes a first sub-passage groove 151 and a second sub-passage groove 152 branching in the middle of the first sub-passage groove 151. The first sub-passage groove 151 is formed to extend along the X-axis direction of the measurement unit 113 between the sub-passage inlet 131 opened to the side surface 123 on one side of the measurement unit 113 and the first outlet 132 opened to the side surface 124 on the other side of the measurement unit 113. The first sub-passage groove 151 forms, in cooperation with the cover 200, a first sub-passage A which takes in the intake air 2 from the sub-passage inlet 131 and returns the taken intake air 2 from the first outlet 132 to the main passage 22a. The first sub-passage A has a flow path extending from the sub-passage inlet 131 along the flow direction of the intake air 2 in the main passage 22a to be connected to the first outlet 132.

The second sub-passage groove 152 branches at the intermediate position of the first sub-passage groove 151, is bent toward the proximal end portion side (flange side) of the measurement unit 113, and extends along the Z-axis direction of the measurement unit 113. Then, the second sub-passage groove is bent at the proximal end portion of the measurement unit 113 toward the other side (side surface 124 side) of the measurement unit 113 in the X-axis direction, turns around toward the distal end portion of the measurement unit 113, and extends again along the Z-axis direction of the measurement unit 113. Then, the second sub-passage groove is bent in front of the first outlet 132 toward the other side (side surface 124 side) of the measurement unit 113 in the X-axis direction, and is provided so as to be continuous with the second outlet 133 opened to the side surface 124 of the measurement unit 113. The second outlet 133 is arranged to face the downstream side of the main passage 22a in the flow direction of the intake air 2. The second outlet 133 has an opening area substantially equal to or slightly larger than that of the first outlet 132, and is formed at a position adjacent to the proximal end portion side of the measurement unit 113 in the longitudinal direction with respect to the first outlet 132.

The second sub-passage groove 152 forms, in cooperation with the cover 200, a second sub-passage B which allows the intake air 2 branched from the first sub-passage A and flowing in to pass therethrough and returns the intake air 2 from the second outlet 133 to the main passage 22a. The second sub-passage B has a flow path for reciprocation along the Z-axis direction of the measurement unit 113. That is, the second sub-passage B has a forward passage portion B1 which branches in the middle of the first sub-passage A and extends toward the proximal end portion side of the measurement unit 113 (a direction away from the first sub-passage A), and a return passage portion B2 which is folded back and turned around on the proximal end portion side (the end portion of a separation passage portion) of the measurement unit 113 and extends toward the distal end portion side (a direction approaching the first sub-passage A) of the measurement unit 113. The return passage portion B2 is connected to the second outlet 133 opened toward the downstream side in the flow direction of the intake air 2 at a position on the downstream side in the flow direction of the intake air 2 in the main passage 22a with respect to the sub-passage inlet 131.

In the second sub-passage B, the chip package 300 to be described later is arranged at the intermediate position of the forward passage portion B1. Since the second sub-passage B is formed to extend along the longitudinal direction of the measurement unit 113 and reciprocate, the passage length can be secured longer, and the influence on the chip package 300 can be reduced in a case where a pulsation occurs in the main passage 22a.

Similarly to the housing 100, the cover 200 is formed by an injection-molded article of a synthetic resin material, and is attached to the side surface of the housing 100 to cover the housing 100. The cover 200 may be formed of, for example, a metal material such as an aluminum alloy by precision casting such as lost wax or die casting.

Figure 4A:
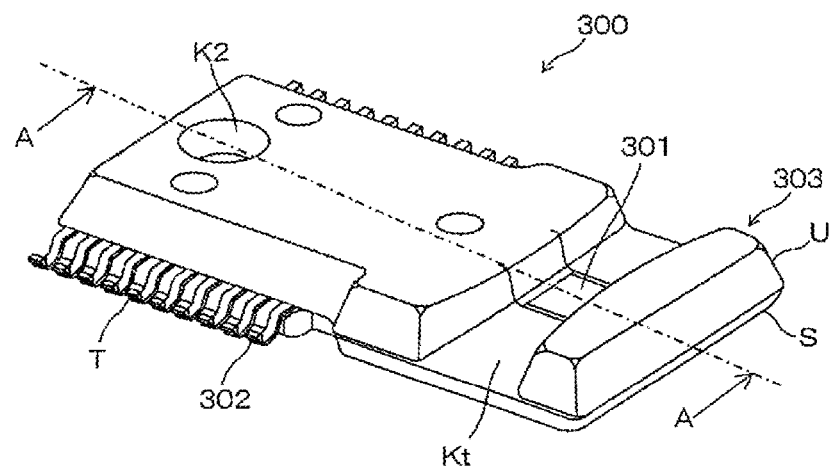
Figure 4B:
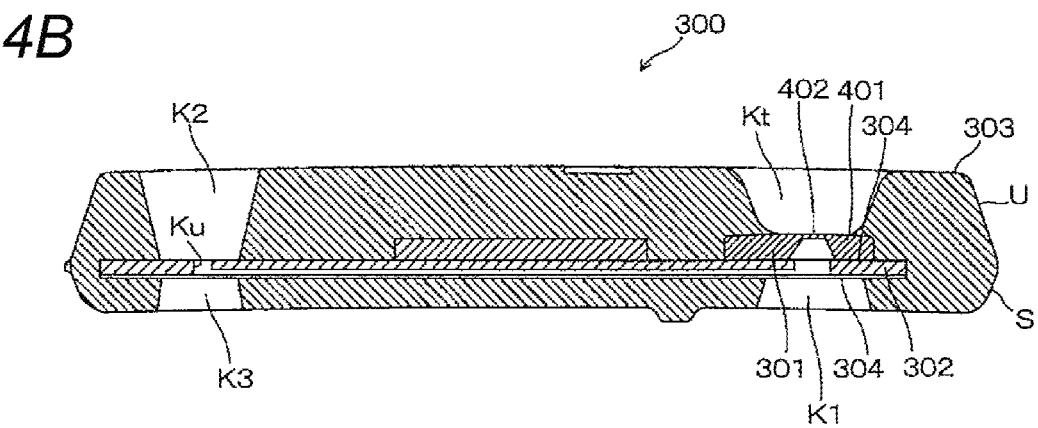
Figure 5:
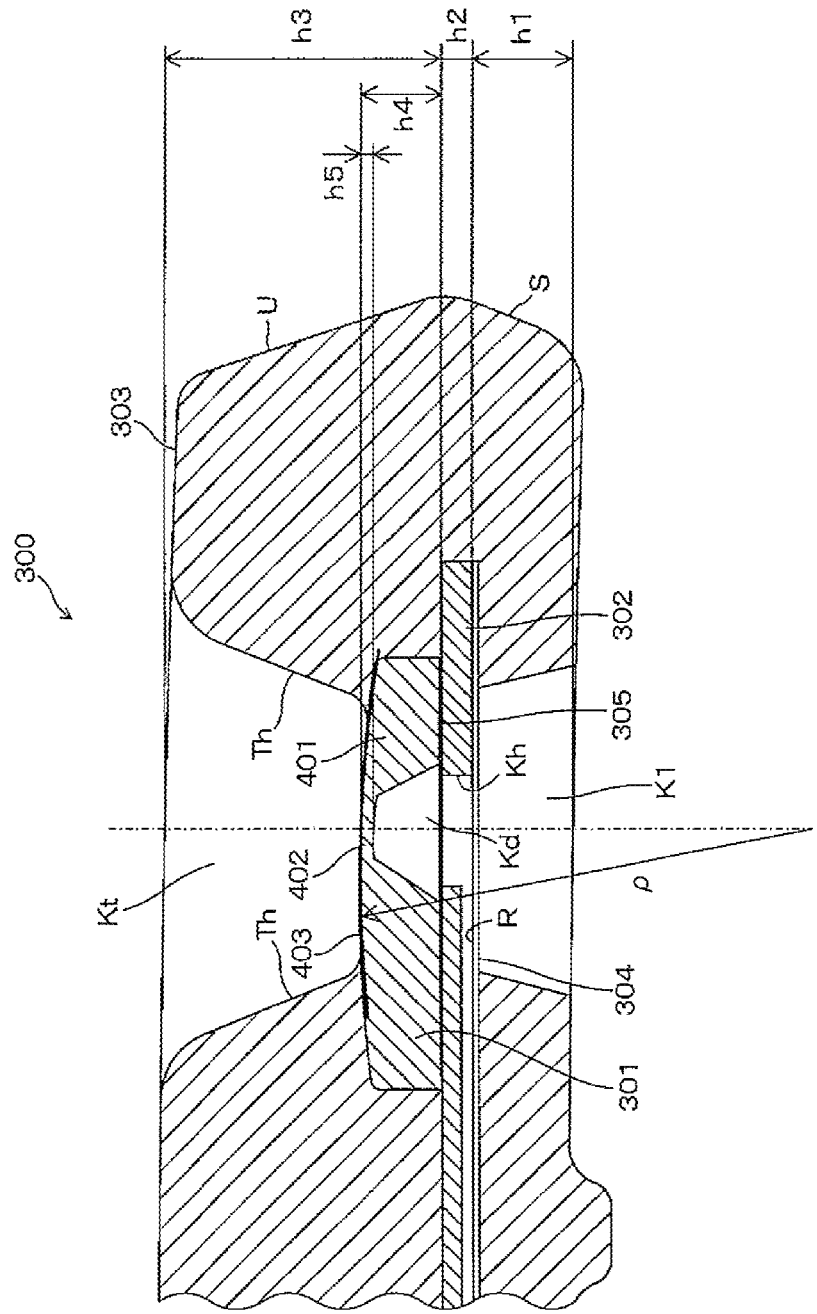
FIG. 5 is an enlarged cross-sectional view in which a part of a cross section of the resin-sealed package is enlarged.

As illustrated in FIGS. 4A, 4B, and 5, the chip package 300 includes an airflow amount measuring element (hereinafter, simply referred to as an element.) 301, a lead frame 302, a sealing resin member 303, a polyimide tape 304, and a die attach film (hereinafter, referred to as a DAF) 305. The chip package 300 is manufactured by setting the element 301 and the lead frame 302 on which the element 301 is mounted in a mold, allowing a mold resin to flow into the mold, and thermally curing the mold resin.

The chip package 300 includes the sealing resin member 303 having a flat plate shape which is substantially rectangular in plan view. The sealing resin member 303 has a proximal end portion on one longitudinal side arranged in the circuit chamber 135 of the housing 100 and a distal end portion on the other longitudinal side arranged in the second sub-passage B of the housing 100. At the proximal end portion of the sealing resin member 303, a plurality of terminal portions T are arranged to protrude in directions away from each other along the short direction. Then, a recessed groove is formed in the distal end portion of the sealing resin member 303 to extend along the short direction. The recessed groove is provided on the front surface of the distal end portion of the sealing resin member 303, and forms a passage Kt through which the intake air 2 flows. The distal end portion of the sealing resin member 303 is arranged in the forward passage portion B1 in the forward passage portion B1 and the return passage portion B2 forming the second sub-passage B of the housing 100 illustrated in FIG. 3. The chip package 300 measures the flow amount of the intake air 2 flowing in the second sub-passage B and transmits a signal of the measurement result to the control device 4.

As illustrated in FIG. 5, the element 301 includes an element body 401 serving as a substrate. The element body 401 is configured by a flat plate-like member, and is joined to the lead frame 302 by the DAF 305 provided between the lead frame and the back surface. The front surface of the element body 401 is exposed as a detection portion from the sealing resin member 303. An opening Kd is formed in the element body 401 to open on the back surface, and a thin film portion 402 is formed to close the opening Kd on the front surface side of the element body 401. The thin film portion 402 includes a first temperature difference sensor 407, a first heater temperature sensor 405, a heater 404, a second heater temperature sensor 406, and a second temperature difference sensor 408 arranged in the main flow direction of a measurement target medium, and is a detection portion for detecting the flow amount of the measurement target medium. Hereinafter, the arrangement direction is expressed as a lateral direction (short direction), and a direction perpendicular to the arrangement direction is expressed as a vertical direction (longitudinal direction). The element 301 has, on the front surface of the element body 401, the thin film portion 402 as the detection portion and a peripheral region portion 403 extending continuously around the thin film portion 402.

Figure 8A:
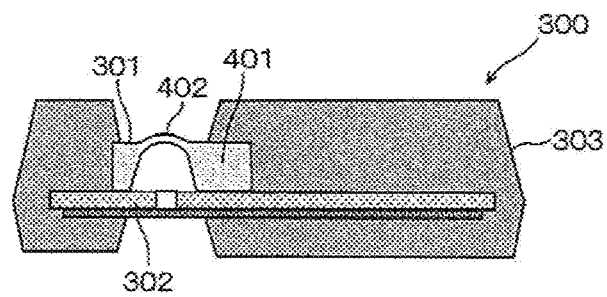

The thin film portion 402 is configured by, for example, a thin film having a thickness of less than several pm, and is exposed to the passage Kt of the sealing resin member 303. As illustrated in FIG. 8C, in the thin film portion 402, the first temperature difference sensor 407, the first heater temperature sensor 405, the heater 404, the second heater temperature sensor 406, and the second temperature difference sensor 408 are formed, and a PIQ layer 409 is formed around the upper side of the thin film portion 402. The thin film portion 402 can measure the flow amount of the intake air 2 flowing through the front surface of the thin film portion 402 on the basis of the temperature distribution in a direction along the surface of the thin film portion 402. In the element body 401, the opening Kd having a truncated cone shape of which the opening diameter increases when a distance from the back surface of the thin film portion 402 increases is formed on the back surface side of the thin film portion 402.

In the element 301 in the state of a single body before being molded by the sealing resin member 303, the front surface and the back surface of the element body 401 have a flat surface shape without curvature. When the element 301 is molded together with the lead frame 302 by the sealing resin member 303, a bending stress is generated due to contraction of the resin between the sealing resin member 303 and the lead frame 302. At the time of molding, a crosslinking density or a volume contraction between molecules of the sealing resin member 303 change in the process of curing from a viscous fluid, and thus a volume decreases after curing.

Therefore, a molding contraction rate means that the volume contracts after the sealing resin member injected into the mold is cooled, and a rate of the contraction (hereinafter, referred to as a contraction rate) is generally defined by following Expression 2).

[Mathematical Formula 1]   Expression (2)

$$\text{Molding concentration rate (\%)} = \frac{\text{Volume immediately after molding} - \text{Volume after cooling mold}}{\text{Volume immediately after molding}} \times 100$$

The molding contraction rate is also expressed by following Expression (3) according to the JIS K6911 standard associated with a mold condition and a test piece condition of the sealing resin member 303. When the dimensions of the mold at a room temperature are D1, D2, D3, and D4, the dimensions of the molded product at a room temperature are d1, d2, d3, and d4, and averaging is performed with four measurement parts, the contraction rate of the sealing resin member 303 is obtained by following Expression (3).

[Mathematical Formula 2]   Expression (3)

$$\text{Molding contraction rate (\%)} = \frac{1}{4} \times \left[ \frac{D1 - d1}{D1} + \frac{D2 - d2}{D2} + \frac{D3 - d3}{D3} + \frac{D4 - d4}{D4} \right]$$

When the element 301 is molded by the sealing resin member 303, the front surface side of the element body 401 is deformed to protrude from a flat shape to a convex shape and curve. In a case where deformation is made in this manner, in the element 301, a curvature radius ρ of the exposed portion of the element 301 exposed from the sealing resin member 303 is 2.13 or less. More specifically, the peripheral region portion 403, which is a region not including the thin film portion 402, in the front surface of the element body 401 has the curvature radius ρ (mm) of 0 or more, and is formed to satisfy a relationship of ρ≤2.13 in the longitudinal direction of the chip package 300 as illustrated in FIG. 5. As illustrated in FIG. 5, the upper surface of the element 301 is specifically a boundary portion between the element 301 and the sealing resin member 303 covering the upper surface of the element 301. The curvature radius ρ is expressed by following Expression (1).

[Mathematical Formula 3]

$$\frac{1}{\rho} = \frac{h1 + h2 + h3 + h4 + h5}{h1^3 + h2^3 + h3^3 + h4^3 + h5^3}(1 - \beta) \qquad \text{Expression (1)}$$

However, in Expression (1), as illustrated in FIG. 5, on the front surface side of the sealing resin member 303 in which the element 301 is provided with the lead frame 302 interposed therebetween and the back surface side of the sealing resin member on the opposite side to the element 301, h1 (mm) represents the thickness (hereinafter, referred to as the thickness of a back surface resin portion S) of the sealing resin member 303 on the back surface side from the lead frame 302, h2 (mm) represents the thickness (mm) of the lead frame 302, h3 (mm) represents the thickness (hereinafter, referred to as the thickness of a front surface resin portion U) of the sealing resin member 303 on the front surface side from the lead frame 302, h4 (mm) represents the thickness of the element body 401, h5 (mm) represents the thickness of the thin film portion 402, and β (%) represents a curing contraction rate of the sealing resin member 303.

The curvature radius ρ of the peripheral region portion 403 of the front surface of the element body 401 can be measured by the following method. That is, by cutting the chip package 300 at the position of the element 301, the curvature radius ρ of the front surface of the element body 401 appearing on the cut surface can be measured. In addition, the curvature radius ρ can be measured nondestructively by a non-contact displacement measurement method using light such as a laser beam. In addition, the curvature radius ρ can also be measured nondestructively by scanning the peripheral region portion 403 of the front surface of the element body 401 with a three-dimensional measuring machine (also referred to as a 3D scanner).

The curvature radius ρ is calculated by using a general formula of the bending stress of the sealing resin member 303. FIG. 6C illustrates the items of the calculation formula and the symbols of the items. In a general beam, when Young's modulus is defined as E, a cross-sectional secondary moment is defined as I, a bending moment is defined as M, and ρ is the curvature radius of the beam, following Expression (a) is obtained.

[Mathematical Formula 4]

$$\frac{1}{\rho} = \frac{M}{EI} \tag{a}$$

As illustrated in FIG. 6A, in a case where the thin film portion 402 is deformed to be convex,

[Mathematical Formula 5]

$$\frac{1}{\rho} = \frac{M}{EI} < 0 \tag{b}$$

is satisfied.

As illustrated in FIG. 6B, in a case where the thin film portion 402 is deformed to be concave,

[Mathematical Formula 6]

$$\frac{1}{\rho} = \frac{M}{EI} > 0 \tag{c}$$

is satisfied. In a laminate to be the sealing resin member 303 of the embodiment, the amount of warpage of the thin film portion 402 is determined by a composite balance of h1, h2, and h3 illustrated in FIG. 6C. In this regard, the apparent warpage of h1 to h5 is obtained.

In a case where the curing contraction rate of the resin is β, β has a relationship of following Expression (d).

[Mathematical Formula 7]

$$\frac{1}{\rho} \propto (1 - \beta) \tag{d}$$

From Expression (d), in Expression (a),

[Mathematical Formula 8]

$$\frac{1}{\rho} = \frac{M}{EI}(1 - \beta) \tag{f}$$

is satisfied. The bending moment M is expressed by:

$$M = \Sigma(h_i \times \alpha_i \times \Delta T)$$

$$= (h1+h3)\alpha1 \times \Delta T + h2 \times \alpha2 \times \Delta T + (h4+h5)\alpha3 \times \Delta T$$

$$= (h1 \times \alpha1 + h2 \times \alpha2 + h3 \times \alpha1 + h4 \times \alpha3 + h5 \times \alpha3)$$

$$= \Delta T[\alpha1(h1+h3) + \alpha2(h2) + h4 + h5)] \qquad \text{[Mathematical Formula 9]}$$

Here, when E, α, and ΔT applied to M are dimensionless, following Expression (g) is obtained.

[Mathematical Formula 10]

$$EI \propto \Sigma(h_1) = h1 + h2 + h3 + h4 + h5 \tag{g}$$

Following Expressions (h) and (i) are obtained.

[Mathematical Formula 11]

$$M \propto \Sigma\left(\frac{1}{12}h_i^3\right) \tag{h}$$

$$EI \propto \Sigma(h_i^3) = h1^3 + h2^3 + h3^3 + h4^3 + h5^3 \tag{i}$$

Here, when (h) (i)→(f), following Expression (j) is obtained.

[Mathematical Formula 12]

$$\frac{1}{\rho} = \frac{M}{EI}(1 - \beta) = \frac{h1 + h2 + h3 + h4 + h5}{h1^3 + h2^3 + h3^3 + h4^3 + h5^3}(1 - \beta) \tag{j}$$

Therefore, from Expression (a) of the curvature (1/ρ) of the beam, it is obtained by a following composite thickness γ of the chip package 300 according to the present embodiment that the warpage of the thin film portion 402 is 0 or that it is satisfied the warpage ≤3 μm in the case of the structure of the present embodiment.

$$\gamma = \frac{h1 + h2 + h3 + h4 + h5}{h1^3 + h2^3 + h3^3 + h4^3 + h5^3} \qquad \text{[Mathematical Formula 13]}$$

Here, when γ is substituted into Expression (j), $$\frac{1}{\rho} = \gamma(1 - \beta) \qquad \text{[Mathematical Formula 14]}$$

is satisfied, and a general formula of curvature is obtained. The specific verification of this general formula will be described later.

The lead frame 302 is formed by a metal material thin plate such as copper (Cu) having a high conductivity, and includes a pattern portion (not illustrated) and a terminal portion T illustrated in FIG. 4A. The terminal portion T is connected to a terminal pad of the circuit board 311. The lead frame 302 supports and fixes the element 301 via the DAF 305. That is, the element 301 is mounted on the lead frame 302. In the lead frame 302, as illustrated in FIG. 5, a through hole Kh is formed to communicate with the opening Kd of the thin film portion 402, and a through hole Ku is formed to communicate with an opening K3 of the front surface resin portion U to be described later. The through hole Kh and the through hole Ku are connected by a communication path R (see FIG. 4B). The through hole Kh, the through hole Ku, and the communication path R function such that the pressure in the opening Kd of the thin film portion 402 is substantially equal to the atmospheric pressure.

As illustrated in FIGS. 4B and 5, the sealing resin member 303 has the back surface resin portion S having the thickness h1 and the front surface resin portion U having the thickness h3, which are made of a material of a synthetic resin, a so-called mold resin. The thickness h3 of the front surface resin portion U is twice or more the thickness h1 of the back surface resin portion S. The sealing resin member 303 covers the element 301 and the lead frame 302 with the back surface resin portion S and the front surface resin portion U to integrate the components. As the mold resin, a material having a curing contraction rate β of 0.18% or more is selected. The material of the mold resin is not particularly limited as long as the mold resin is a synthetic resin having a curing contraction rate β of 0.18% or more.

As illustrated in FIGS. 4 and 5, in the sealing resin member 303, the periphery of the thin film portion 402 and the thin film portion 402 is exposed to form the passage Kt for passing an airflow. In addition, in the back surface resin portion S of the sealing resin member 303, an opening (opening portion) K1 is formed to have a truncated cone shape of which the opening diameter increases when a distance from the lead frame 302 increases. The opening K1 is provided at a position opposite to the element 301 with the lead frame 302 interposed therebetween. Further, in the front surface resin portion U of the sealing resin member 303, an opening K2 is formed at the end portion opposite to the passage Kt in the longitudinal direction (vertical direction) of the sealing resin member 303. Then, in the back surface resin portion S of the sealing resin member 303, the opening K3 is formed at the end portion opposite to the opening K1 in the longitudinal direction of the sealing resin member 303.

As illustrated in FIGS. 4B and 5, the sealing resin member 303 has the recessed groove-shaped passage Kt on the front surface. The passage Kt of the sealing resin member 303 has a pair of passage walls Th and a bottom wall where the front surface of the element body 401 is exposed. The pair of passage walls Th has a throttle shape in which the opening area (cross-sectional area) of the passage Kt gradually narrows toward the thin film portion 402 as the detection portion. In the sealing resin member 303, the pair of passage walls Th forming the passage Kt covers both side edges of the element 301 in a direction orthogonal to the airflow of passing through the passage Kt, and the front surface resin portion U is formed such that the thin film portion 402 is exposed to the passage Kt. Therefore, when the sealing resin member 303 is deformed by thermal contraction, the element 301 is also deformed together with the sealing resin member 303 by receiving a stress from the front surface resin portion U.

The polyimide tape 304 is made of a polymer compound containing an imide bond, and has a high heat resistance, an excellent mechanical property, and a resistance to chemicals. The polyimide tape 304 is provided on the surface of the lead frame 302 opposite to the surface on which the element 301 is mounted, and blocks the through hole Kh, the through hole Ku, and the communication path R of the lead frame 302.

The DAF 305 is made of a film adhesive material having a high adhesion reliability, and is sandwiched between the element 301 and the lead frame 302 to bond the element 301 and the lead frame 302. The DAF 305 is provided with an opening which communicates between the opening Kd of the thin film portion 402 and the through hole Kh of the lead frame 302.

In the chip package 300 according to the present embodiment, the sealing resin member 303 thermally contracts by curing at the time of forming the sealing resin member 303, and warpage occurs in the thin film portion 402, but the occurrence of warpage has been specifically examined. When the amount (mm) of warpage of the thin film portion 402 increases, the measurement accuracy of the flow amount of the intake air 2 decreases, and thus the amount of warpage of the thin film portion 402 is preferably small. Hereinafter, various factors such as the amount of warpage of the thin film portion 402, a relationship between the thin film portion 402 and the curing contraction rate β, and the curvature radius ρ will be specifically described with reference to the drawings.

<Action of thermal contraction of sealing resin member 303 and amount of warpage of thin film portion 402> First, the action of thermal contraction of the sealing resin member 303 and the amount of warpage of the thin film portion 402 have been specifically verified in Examples 1 and 2 and Comparative Examples 1 and 2 of the chip package 300 according to the present embodiment. Note that with the flat front surface of the thin film portion 402 before the warpage occurs used as a reference, the amount (mm) of warpage of the thin film portion 402 refers to a height (mm) from the reference of the thin film portion 402 which becomes a convex shape due to the warpage of the thin film portion 402 to the top of the convex shape.

Figure 7:
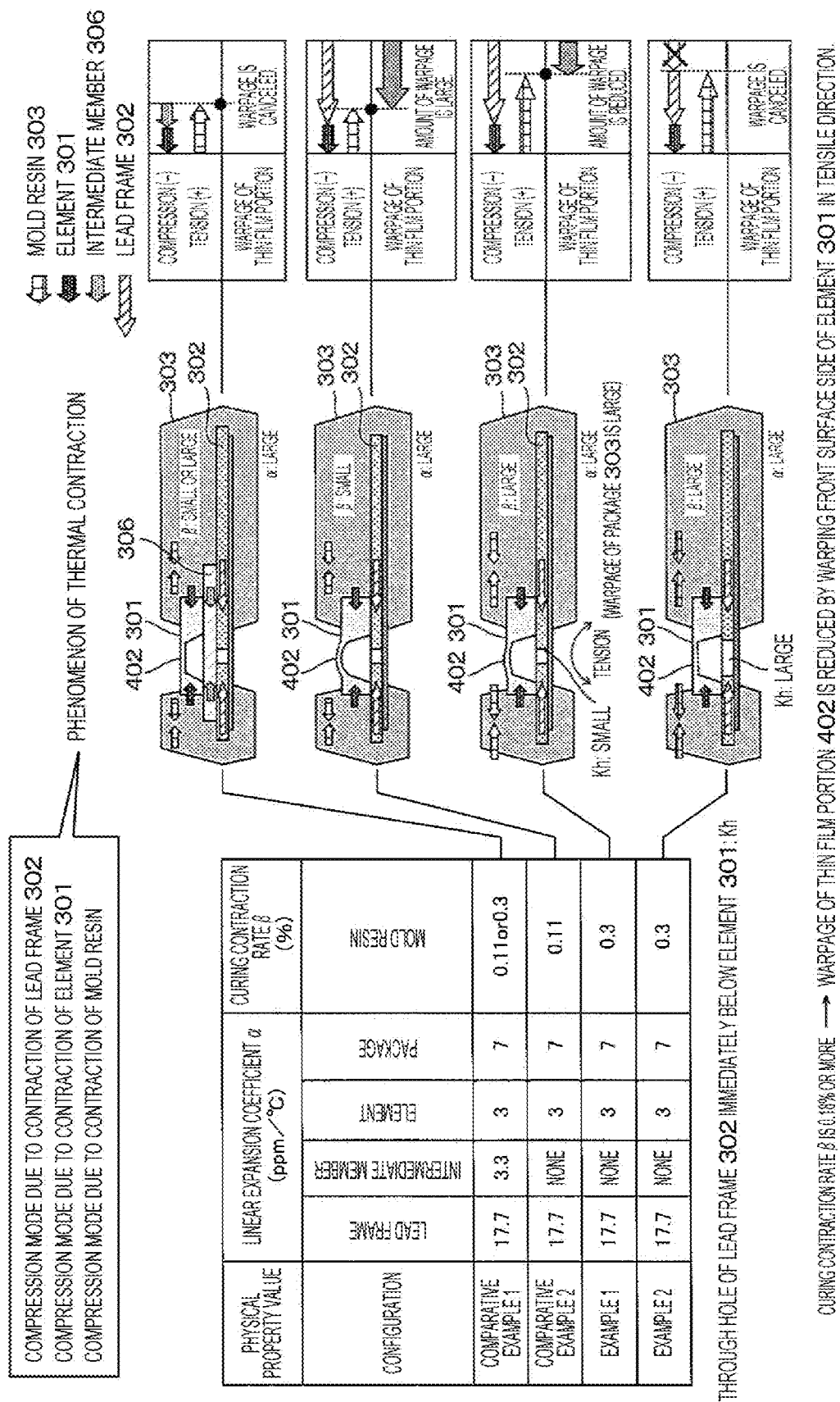
FIG. 7 is a diagram for explaining a force acting on the element and a lead frame due to thermal contraction of a mold resin.

In the chip package according to Comparative Example 1, as illustrated in FIG. 7, a linear expansion coefficient α (ppm/° C.) of the lead frame 302 is 17.7, and an intermediate member 306 is sandwiched between the element 301 and the lead frame 302. The linear expansion coefficient α of the element 301 is 3, the linear expansion coefficient α of the package is 7, and the curing contraction rate β (%) of the mold resin is 0.11 or 0.3.

In the chip package according to Comparative Example 2, the linear expansion coefficient α of the lead frame 302 is 17.7, there is no intermediate member between the element 301 and the lead frame 302, the linear expansion coefficient α of the element 301 is 3, the linear expansion coefficient α of the mold resin of the sealing resin member 303 is 7, and the curing contraction rate β of the mold resin of the package is 0.11.

In the chip package 300 according to Example 1, as illustrated in FIG. 7, the linear expansion coefficient α of the lead frame 302 is 17.7, there is no intermediate member between the element 301 and the lead frame 302, the linear expansion coefficient α of the element 301 is 3, the linear expansion coefficient α of the mold resin of the sealing resin member 303 is 7, and the curing contraction rate β of the mold resin of the sealing resin member 303 is 0.3.

In the chip package 300 according to Example 2, similarly to the airflow amount measuring device 20 according to Example 1, the linear expansion coefficient α of the lead frame 302 is 17.7, there is no intermediate member between the element 301 and the lead frame 302, the linear expansion coefficient α of the element 301 is 3, the linear expansion coefficient α of the mold resin of the sealing resin member 303 is 7, and the curing contraction rate β of the mold resin of the sealing resin member 303 is 0.3.

As illustrated in FIG. 7, in the chip package 300 according to Example 2, the inner diameter of the through hole Kh of the lead frame 302 is formed larger than that of the chip package 300 according to Example 1.

In the chip package according to Comparative Example 1, when the mold resin thermally contracts at the time of curing, a compressive force (N) expressed by (−) toward the central portion of the element 301 and a tensile force (N) expressed by (+) toward a direction away from the central portion of the element 301 act on the mold resin, and a compressive force toward the central portion of the element 301 acts on the element 301, the intermediate member 306, and the lead frame 302. In the chip package according to Comparative Example 1, the intermediate member 306 can receive the compressive force generated by the contraction of the lead frame 302, and the compressive force from the lead frame 302 can be prevented from accumulating in the element 301.

In the chip package according to Comparative Example 1, the compressive force acting on the element 301 and the intermediate member 306 and the tensile force acting on the sealing resin member 303 are balanced, the force acting on the thin film portion 402 disappears, and the warpage of the thin film portion 402 is canceled. In Comparative Example 1, even when the curing contraction rate β of the mold resin is 0.11 or 0.3, the occurrence of warpage of the thin film portion 402 is suppressed by the presence of the intermediate member 306 regardless of the magnitude of the curing contraction rate.

In the chip package according to Comparative Example 2, similarly to Comparative Example 1, when the mold resin of the sealing resin member 303 thermally contracts at the time of curing, a compressive force toward the central portion of the element 301 and a tensile force in a direction away from the central portion of the element 301 act on the sealing resin member 303, and a compressive force toward the central portion of the element 301 acts on the element 301 and the lead frame 302. Since the intermediate member is not provided in Comparative Example 2, the compressive force generated by the contraction of the lead frame 302 directly acts on the element 301 and accumulates. Therefore, a compressive force acts on the thin film portion 402, and the amount of warpage of the thin film portion 402 is increased.

In the chip package 300 according to Example 1, as illustrated in FIG. 7, when the mold resin of the sealing resin member 303 thermally contracts at the time of curing, a relatively large compressive force toward the central portion of the element 301 and a relatively large tensile force in a direction away from the central portion of the element 301 act on the sealing resin member 303, and a compressive force toward the central portion of the element 301 acts on the element 301 and the lead frame 302.

As a result, the tensile force acting on the sealing resin member 303 relatively increases with respect to the compressive force acting on the element 301 and the lead frame 302, and the warpage of the sealing resin member 303 increases. When the warpage of the sealing resin member 303 increases, a relatively small compressive force acts on the thin film portion 402, and the amount of warpage of the thin film portion 402 is reduced as compared with Comparative Example 2. Therefore, it can be seen that the warpage of the thin film portion 402 is reduced by actively warping the element 301 in a tensile direction.

In the chip package 300 according to Example 2, similarly to Example 1, when the mold resin of the sealing resin member 303 thermally contracts at the time of curing, a relatively large compressive force toward the central portion of the element 301 and a relatively large tensile force in a direction away from the central portion of the element 301 act on the sealing resin member 303, and a compressive force toward the central portion of the element 301 acts on the element 301 and the lead frame 302.

However, in Example 2, unlike Example 1, the through hole Kh of the lead frame 302 is formed to be larger than the through hole Kh of Example 1, and thus the compressive force acting on the lead frame 302 is halved to be relatively small. As a result, the tensile force acting on the sealing resin member 303 relatively increases with respect to the compressive force acting on the element 301 and the lead frame 302, and the warpage of the sealing resin member 303 increases. When the warpage of the sealing resin member 303 increases, a relatively small compressive force acts on the thin film portion 402, and the amount of warpage of the thin film portion 402 is greatly reduced as compared with Example 1. Therefore, it can be seen that the warpage of the thin film portion 402 is canceled by largely warping the element 301 in the tensile direction.

As can be seen from the results of Comparative Example 1, Comparative Example 2, Example 1, and Example 2, when the sealing resin member 303 is cooled from the molding temperature to a normal temperature, the contraction of the lead frame 302, that is, a so-called return amount is larger than that of the element 301 due to the difference in the linear expansion coefficient α of each component, which causes the thin film portion 402 to be compressed and deformed. At this time, when the curing contraction rate β of the mold resin of the sealing resin member 303 is large, the compressive stress of the thin film portion 402 generated by the contraction of the lead frame 302 can be alleviated by the tensile force acting on the sealing resin member 303.

Therefore, a stress hardly concentrates on the thin film portion 402, and the occurrence of deformation of the thin film portion 402 is suppressed. In comparison with Comparative Example 2, the chip package 300 of Example 1 and Example 2 applies the tensile force to the element 301, and thus the warpage of the thin film portion 402 due to the compressive stress acting on the element 301, that is, the compressive force acting on the element 301 is reduced.

<Amount of warpage of thin film portion 402 in lateral direction and vertical direction> Next, a relationship between the amount (mm) of warpage of the thin film portion 402 in the lateral direction and the amount of warpage (mm) in the vertical direction has been specifically verified for the same configuration having the intermediate member as in Comparative Example 1 described above and the same configuration as in Example 1 described above in the chip package 300 according to the present embodiment. In this verification, for the chip package 300 illustrated in FIG. 8A, the criterion of the amount (mm) of warpage of the thin film portion 402, that is, the determination criterion of an allowable amount of warpage is required. Note that in the graph of FIG. 9, a black circle indicates the chip package 300 having a configuration without the intermediate member, and a black square indicates the chip package having a configuration with the intermediate member. In addition, in two columns of graphs on the right side in FIG. 9, the left graphs indicate the amount of warpage of the diaphragm in the lateral direction, and the right graphs indicate the amount of warpage of the diaphragm in the vertical direction.

Figure 8B:
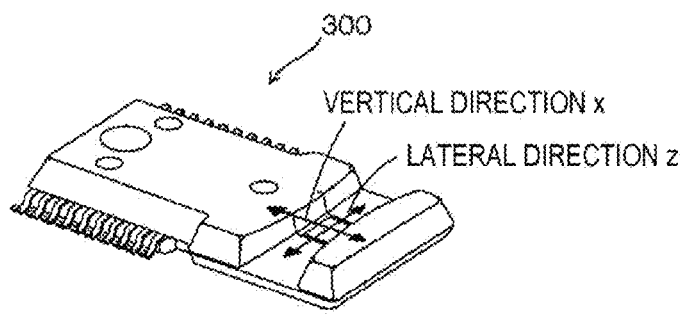
Figure 8C:
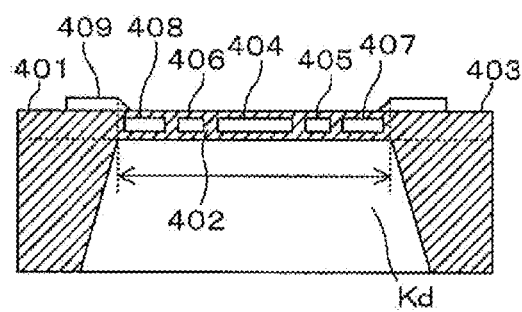
Figure 8D:
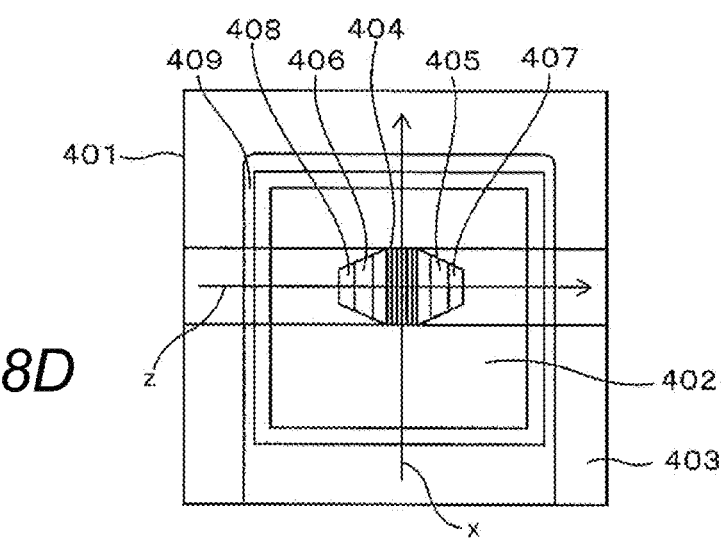
Figure 9:
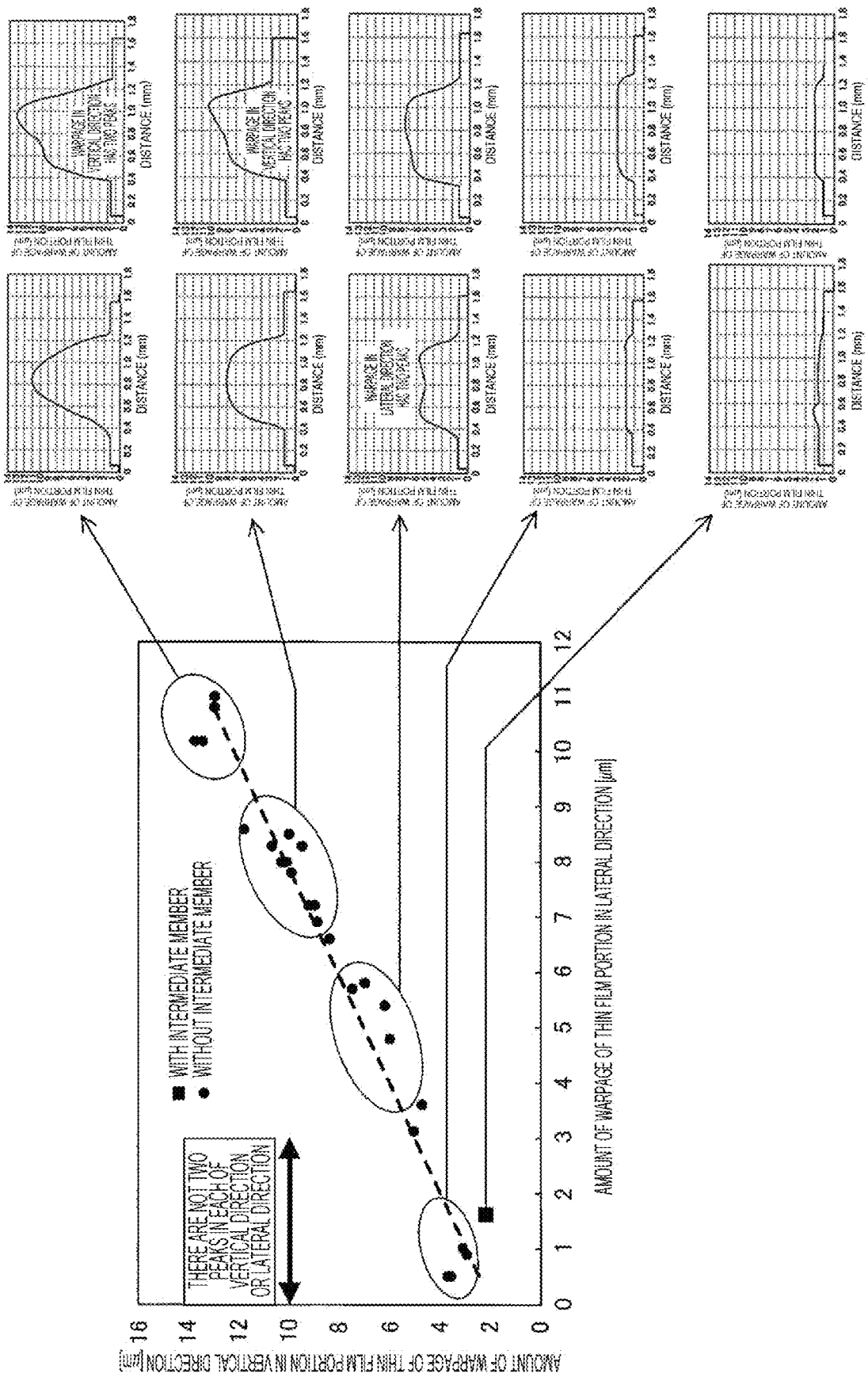
FIG. 9 is a diagram illustrating each of a graph showing the amount of warpage of the thin film portion in the vertical direction and the lateral direction of the element, a graph showing a relationship between the amount of warpage in the lateral direction and a distance, and a graph showing a relationship between the amount of warpage in the vertical direction and a distance.

As for the lateral direction and the vertical direction of the thin film portion 402, as illustrated in FIGS. 8B and 8D, a direction which is the longitudinal direction (X-axis direction) of the chip package 300 and is orthogonal to a flowing direction of the intake air 2 is defined as the vertical direction, and a direction which is the short direction (z-axis direction) of the chip package 300 and is a flowing direction of the intake air 2 is defined as the lateral direction. As illustrated in FIG. 9, when the amount of warpage of the thin film portion 402 in the lateral direction is 10 µm to 11 µm, the amount of warpage of the thin film portion 402 in the vertical direction x is also 12 µm to 14 µm, both of which are large amounts of warpage. When the amount of warpage of the thin film portion 402 in the vertical direction is 12 µm to 14 µm, the shape of warpage in the vertical direction becomes two peaks in the graph of the relationship between the amount of warpage and the distance. Therefore, the thin film portion 402 protrudes, the temperature distribution becomes NG, and the measurement accuracy of the thin film portion 402 cannot be obtained.

When the amount of warpage of the thin film portion 402 in the lateral direction is 7 µm to 9 µm, the amount of warpage of the thin film portion 402 in the vertical direction is also 8 µm to 12 µm, both of which are large amounts of warpage. When the amount of warpage of the thin film portion in the vertical direction is 8 µm to 12 µm, the shape of warpage in the vertical direction becomes two peaks in the graph of the relationship between the amount of warpage and the distance. Therefore, also in this case, the thin film portion 402 protrudes, the temperature distribution becomes NG, and the measurement accuracy of the thin film portion 402 cannot be obtained.

When the amount of warpage of the thin film portion 402 in the lateral direction is 4 µm to 6 µm, the amount of warpage of the thin film portion 402 in the vertical direction is also 6 µm to 8 µm, both of which are relatively large amounts of warpage. When the amount of warpage of the thin film portion 402 in the lateral direction is 6 µm to 8 µm, in the graph of the relationship between the amount of warpage and the distance, the shape of warpage of the thin film portion 402 in the lateral direction becomes two peaks, and also in this case, the measurement accuracy of the thin film portion 402 cannot be obtained.

However, when the amount of warpage of the thin film portion 402 in the lateral direction is 0.5 µm to 1 µm, the amount of warpage of the thin film portion 402 in the vertical direction is 3 µm to 4 µm, and both are relatively small amounts of warpage. In this case, as for the warpage in the lateral direction and the warpage in the vertical direction, in the graph of the relationship between the amount of warpage and the distance, the warpage of the thin film portion 402 is reduced, and the graph has a flat shape without any peaks. Therefore, the shapes of the thin film portion 402 in the lateral direction and the vertical direction are a flat surface, and both have a favorable temperature distribution, and the measurement accuracy can be obtained.

In the configuration including the intermediate member as in Comparative Example 1, when the amount of warpage of the thin film portion 402 in the lateral direction is 1.5 µm, the amount of warpage of the thin film portion 402 in the vertical direction is 2 µm, and both are relatively small amounts of warpage. In this case, as for the warpage in the lateral direction and the warpage in the vertical direction, in the graph of the relationship between the amount of warpage and the distance, the warpage of the thin film portion 402 is reduced, and the graph is a flat graph without any peaks. Therefore, the shapes of the thin film portion 402 in the lateral direction and the vertical direction are a flat surface, and both have a favorable temperature distribution, and the measurement accuracy can be obtained.

In order to secure the measurement accuracy, the amount of warpage of the thin film portion 402 is small, and in the graph of the relationship between the amount of warpage and the distance in both the lateral direction and the vertical direction, it is assumed that the shape of warpage is not two peaks and is flat. However, as illustrated in FIG. 9, it has been found that when the warpage of the thin film portion 402 is 3 µm or less, an accuracy at the same level as that of the chip package having the configuration including the intermediate member can be obtained.

<Curing contraction rate of mold resin and amount of warpage of thin film portion 402> Next, the relationship between the curing contraction rate of the mold resin of the sealing resin member 303 and the amount of warpage of the thin film portion 402 in the chip package 300 according to the present embodiment has been specifically verified. In this verification, the optimum value of the curing contraction rate β of the mold resin is obtained for the chip package 300 illustrated in FIG. 10A.

As illustrated in FIG. 10A, when the curing contraction rate of the resin is 0.3%, the amount of warpage of the thin film portion 402 is 1.5 µm, when the curing contraction rate of the resin is about 0.14%, the amount of warpage of the thin film portion 402 is about 3.2 µm, when the curing contraction rate of the resin is about 0.12%, the amount of warpage of the thin film portion 402 is about 3.5 µm, when the curing contraction rate of the resin is about 0.11%, the amount of warpage of the thin film portion 402 is about 3.9 µm, and when the curing contraction rate of the resin is about 0.09%, the amount of warpage of the thin film portion 402 is about 4.2 µm.

As described above, when the warpage of the thin film portion 402 is 3 µm or less, an accuracy at the same level as that of the chip package having the configuration including the intermediate member can be obtained, but four points marked with black circles in which the curing contraction rate of the resin is about 0.14% or less exceed 3 µm. In addition, as illustrated in FIG. 10A, when the points marked with black circles are connected by a straight broken line, it can be seen that the curing contraction rate of the resin is 0.18%, and the amount of warpage of the thin film portion 402 is 3 µm. Therefore, it is obtained that the optimum value of the curing contraction rate of the resin is 0.18% or more.

<Relationship between warpage of sealing resin member 303 and warpage of thin film portion 402> Next, the relationship between the warpage of sealing resin member 303 and the warpage of thin film portion 402 in the chip package 300 according to the present embodiment has been specifically verified. The warpage of the sealing resin member 303 represents the warpage on the lower surface of the back surface resin portion S of the sealing resin member 303 as illustrated in FIG. 10B. In the graph illustrated in FIG. 10B, Sample 1 is configured similarly to the above-described Example 1, and Sample 2 is configured similarly to the above-described Example 2. Note that the amount of warpage of the sealing resin member 303 is indicated by a bar graph, and the amount of warpage of the thin film portion 402 is indicated by a polygonal line.

When the curing contraction rate of the resin is 0.09%, the amount of warpage of the sealing resin member 303 of Sample 1 is about 5.2 µm, the amount of warpage of the thin film portion 402 is about 5.2 µm, the amount of warpage of the sealing resin member 303 of Sample 2 is about 5.8 µm, and the amount of warpage of the thin film portion 402 is about 4.2 µm. When the curing contraction rate of the resin is 0.11%, the amount of warpage of the sealing resin member 303 of Sample 1 is about 5.5 µm, the amount of warpage of the thin film portion 402 is about 4.8 µm, the amount of warpage of the sealing resin member 303 of Sample 2 is about 5.5 µm, and the amount of warpage of the thin film portion 402 is about 4.8 µm. When the curing contraction rate of the resin is 0.12%, the amount of warpage of the sealing resin member 303 of Sample 2 is about 6.5 µm, and the amount of warpage of the thin film portion 402 is about 3.5 µm. When the curing contraction rate of the resin is 0.14%, the amount of warpage of the sealing resin member 303 of Sample 2 is about 6.6 µm, and the amount of warpage of the thin film portion 402 is about 3.2 µm. When the curing contraction rate of the resin is 0.3%, the amount of warpage of the sealing resin member 303 of Sample 1 is about 7.5 µm, the amount of warpage of the thin film portion 402 is about 2.2 µm, the amount of warpage of the sealing resin member 303 of Sample 2 is about 7.8 µm, and the amount of warpage of the thin film portion 402 is about 1.5 µm.

As illustrated in FIG. 10B, it can be seen that when the curing contraction rate of the resin is 0.18% or more in Sample 1 and Sample 2, it is possible to adopt a configuration without any intermediate members. In addition, when the curing contraction rate of the resin increases, the warpage of the sealing resin member 303 also increases, and it can be seen that the curing contraction rate of the resin and the warpage of the sealing resin member 303 are in a proportional relationship. When the warpage of the sealing resin member 303 increases, the warpage of the thin film portion decreases, and it can be seen that the warpage of the sealing resin member 303 and the warpage of the thin film portion 402 are in an inverse relationship. In addition, it can also be seen that a tensile force acts on the element 301 due to an increase in the curing contraction rate of the resin and the warpage of the sealing resin member 303, and the warpage of the thin film portion 402 is reduced.

Figure 11A:
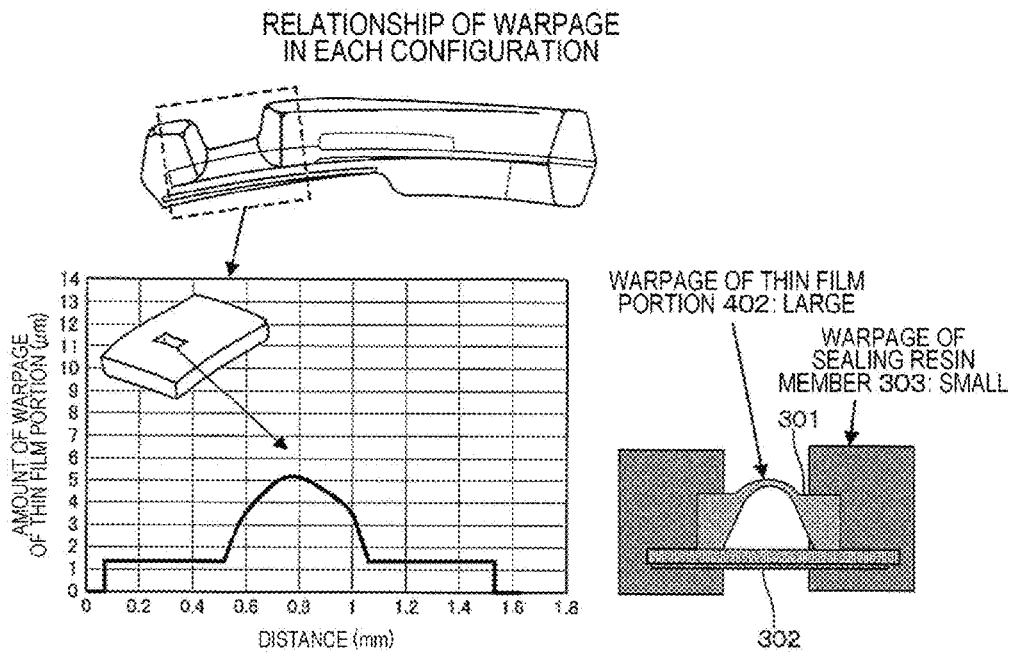
Figure 11B:
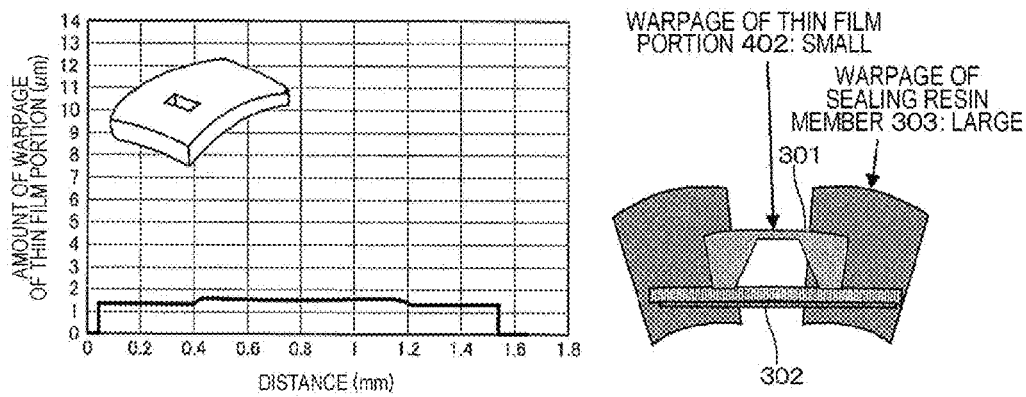

<Relationship of warpage in each configuration> Next, the relationship of warpage in each configuration in the chip package 300 according to the present embodiment has been verified again. As illustrated in FIG. 11A, in a case where the curing contraction rate of the resin is 0.09%, the amount of warpage of the thin film portion 402 is 4.4 µm. When the warpage of the sealing resin member 303 is small, the warpage of the thin film portion 402 increases, and it can be seen that there is an inverse relationship therebetween. As illustrated in FIG. 11B, in a case where the curing contraction rate of the resin is 0.3%, the amount of warpage of the thin film portion 402 is 1.5 µm. When the warpage of the sealing resin member 303 is large, the warpage of the thin film portion 402 decreases, and it can be seen that there is an inverse relationship therebetween.

<Calculation of specific numerical values using general formula> Next, as for specific numerical values of warpage in each configuration in the chip package 300 according to the present embodiment, verification has been performed with the thickness h5 of the thin film portion 402 substituted as a parameter into Expression (1) of the curvature radius ρ. Here, the amount of warpage of the thin film portion 402 has been obtained by thermal stress analysis (from before cooling to after cooling). As the specific numerical values and parameters, the numerical values described in FIG. 12 have been used. Note that values other than the parameter h5 are fixed values. As for the curvature 1/ρ and curvature radius ρ calculated, in a case where h5 is 0.0005, 1/ρ is 0.461, and ρ is 2.168, in a case where h5 is 0.001, 1/ρ is 0.477, and ρ is 2.095, in a case where h5 is 0.002, 1/ρ is 0.491, and ρ is 2.037, in a case where h5 is 0.0047, 1/ρ is 0.505, and ρ is 1.980, and in a case where h5 is 0.008, 1/ρ is 0.509, and ρ is 1.983.

From the relationship between the curing contraction rate β and the warpage of the thin film portion 402 in FIG. 13, it is obtained that the reference of the optimum value is that the amount of warpage of the thin film portion 402 is 3 µm or less, and the curing contraction rate β is 0.18% or more.

When the calculation result is verified in light of these optimum values, it can be seen that the curvature 1/ρ is 0.47 or more. When the curvature 1/ρ is converted into the curvature radius ρ, it can be seen that the curvature radius ρ is 2.13 or less. In addition, it can be seen that the optimum value of the ratio h3/h1 of the thickness of the front surface resin portion U to the thickness of the back surface resin portion S is twice or more. Note that it has been verified that the optimum value of the curing contraction rate β is 0.18%.

Figure 14:
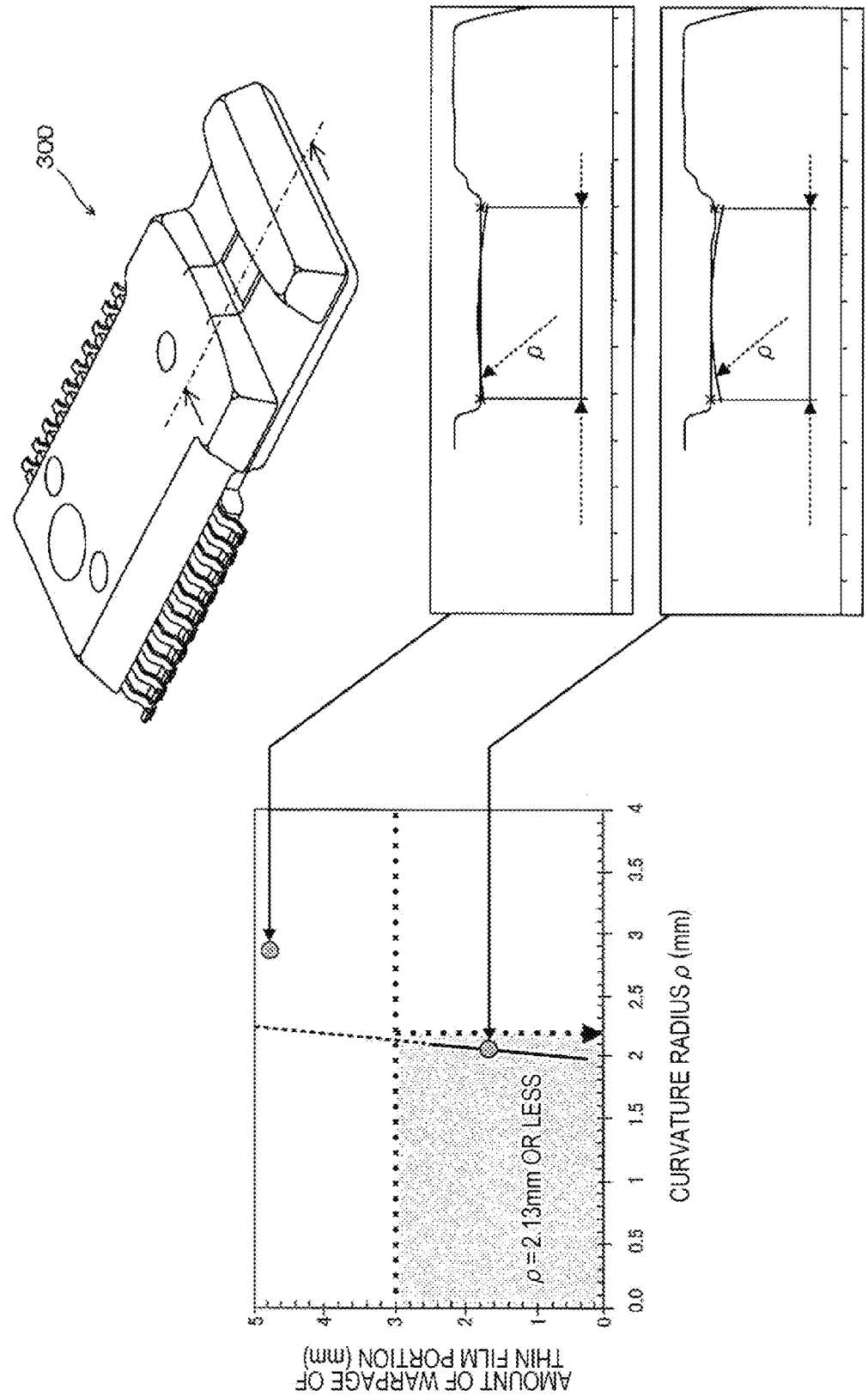
FIG. 14 is an explanatory diagram for explaining the curvature radius of the element and the amount of warpage of the thin film portion.

<Actual measurement of curvature radius ρ> Next, the curvature radius ρ of the upper surface of the element 301 in the chip package 300 according to the present embodiment has been actually measured, and whether or not the result coincides with the calculation result of the general formula has been verified. As illustrated in FIG. 14, VR-3000 of a 3D scanner has been used as the measuring device. The measurement position has been set to the oxide film area of the element 301, and in the measurement method, the curvature radius ρ has been derived aiming at the exposure dimension (the width of the passage of the intake air 2) of the element 301.

In the measurement result, as illustrated in the graph of FIG. 14, in a case where the curing contraction rate β of the resin is 0.11%, ρ has been 2.76 mm, and the amount of warpage of the thin film portion 402 has been about 4.8 mm. When the curing contraction rate β of the resin is 0.3%, ρ has been 2.05 mm, whereas the amount of warpage of the thin film portion 402 has been about 1.5 mm. Therefore, it has been verified that the measured value of the curvature radius ρ coincides with the calculation result of the general formula.

Hereinafter, effects of the chip package 300 according to the present embodiment will be described. (1) The chip package 300 according to the present embodiment includes the lead frame 302, the element 301 mounted on the lead frame 302 and having the thin film portion 402, and the sealing resin member 303 which seals the lead frame 302 and the element 301 such that at least the thin film portion 402 is exposed. Then, the curvature radius ρ of the exposed portion of the element 301 exposed from the sealing resin member 303 is 2.13 or less.

In the chip package 300 according to the present embodiment, the element 301 is formed to satisfy a condition that the curvature radius ρ (mm) of the exposed portion of the element 301 exposed from the sealing resin member 303 is 2.13 or less, and thus it is possible to obtain an effect of suppressing the occurrence of warpage in the thin film portion 402 when the sealing resin member 303 for sealing the element 301 and the lead frame 302 is formed. That is, the condition that the curvature radius ρ (mm) of the peripheral region portion in the surface of the element 301 after the molding resin forming the sealing resin member 303 is cured is 2.13 or less (ρ≤2.13) is satisfied, and thus there is an effect that the amount of warpage of the thin film portion 402 becomes within 3 µm of the optimum value, the flatness of the front surface of the thin film portion 402 is secured, and the chip package 300 capable of accurately measuring the flow amount of the intake air 2 can be obtained.

In the chip package 300 according to the present embodiment, ρ satisfies the relationship of following Expression (1), and thus, it is possible to obtain an effect that ρ≤2.13 can be reliably calculated by appropriately selecting h1 to h5 and the curing contraction rate β of the chip package 300.

[Mathematical Formula 15]

$$\frac{1}{\rho} = \frac{h1 + h2 + h3 + h4 + h5}{h1^3 + h2^3 + h3^3 + h4^3 + h5^3}(1-\beta) \quad \text{Expression (1)}$$

(2) In the chip package 300 according to the present embodiment, the curing contraction rate β of the molding resin forming the sealing resin member 303 is 0.18% or more, and thus when the sealing resin member 303 is allowed to cool from the molding temperature to a normal temperature, and the sealing resin member 303 can be deformed in a direction of actively warping such that the front surface of the sealing resin member becomes convex. Therefore, it is possible to obtain an effect that the compressive stress of the thin film portion 402 generated by the contraction of the lead frame 302 is alleviated by the tensile force acting on the mold resin, and it is possible to prevent the stress from concentrating on the thin film portion 402 and to suppress the deformation of the thin film portion 402. As a result, it is possible to obtain an effect that the measurement accuracy equivalent to that of a conventional chip package in which the intermediate member is provided to match the linear expansion coefficient α and reduce the warpage of the thin film portion 402 is secured. The chip package 300 according to the present embodiment is not provided with the intermediate member, and thus it is possible to obtain an effect that the production cost is reduced as compared with the conventional chip package having the intermediate member.

(3) In the chip package 300 according to the present embodiment, the sealing resin member 303 has the recessed groove-shaped passage Kt having the pair of passage walls Th and the bottom wall from which the front surface of the element body 401 is exposed, the pair of passage walls Th forming the passage Kt of the sealing resin member 303 covers both side edges of the element 301 in the direction orthogonal to the airflow, and the thin film portion 402 is exposed to the passage Kt. With this configuration, when the sealing resin member 303 is cooled from the molding temperature to a normal temperature, and the front surface resin portion U of the sealing resin member 303 is contracted and deformed, the element 301 is also deformed together with the front surface resin portion U, and a tensile force acts on the thin film portion 402, so that an effect of reducing the amount of warpage of the thin film portion can be obtained.

(4) In the chip package 300 according to the present embodiment, the maximum thickness (mm) h3 of the front surface resin portion U, which is the thickness of the sealing resin member 303 on the front surface side (element 301 side) from the lead frame 302, is formed to be twice or more the maximum thickness (mm) h1 of the back surface resin portion S, which is the thickness of the sealing resin member 303 on the back surface side from the lead frame 302. With this configuration, when the sealing resin member 303 is cooled from the molding temperature to a normal temperature, the front surface resin portion U of the sealing resin member 303 is effectively contracted and deformed, a tensile force acts on the thin film portion 402, so that an effect of reducing the amount of warpage of the thin film portion can be obtained.

(5) In the chip package 300 according to the present embodiment, in a part of the lead frame 302, the through hole Kh is formed in a region obtained by projecting the thin film portion 402 on the lead frame 302 in a direction perpendicular to the front surface of the element 301, and the polyimide tape 304 is attached to the back surface side of the lead frame 302 to cover the through hole Kh. With this configuration, the communication path R communicating with the outside of the sealing resin member 303 can be formed, and the pressure acting on the thin film portion 402 can be made equal to the atmospheric pressure.

(6) In the chip package 300 according to the present embodiment, the sealing resin member 303 has the opening portion K1 such that a part of the tape 304 is exposed.

(7) The opening portion K1 has a truncated cone shape of which the opening diameter increases when a distance from the lead frame 302 increases.

(8) The passage wall Th has a throttle shape in which the opening area of the passage Kt gradually narrows toward the thin film portion 402 (detection portion).

(9) The resin-sealed package is manufactured by performing resin sealing such that the curing contraction rate β of the sealing resin member 303 is 0.18% or more.

(10) The resin-sealed package is manufactured by performing resin sealing such that the curvature radius ρ of the exposed portion of the element 301 exposed from the sealing resin member 303 is 2.13 or less.

Although the embodiment of the present invention has been described in detail above, the present invention is not limited to the above embodiment, and various design changes can be made without departing from the spirit of the present invention described in the claims. For example, the above-described embodiment has been described in detail for easy understanding of the invention and is not necessarily limited to those having all the described configurations. In addition, a part of the configuration of a certain embodiment can be replaced with the configuration of another embodiment, and the configuration of another embodiment can be added to the configuration of a certain embodiment. Further, it is possible to add, delete, and replace other configurations for a part of the configuration of each embodiment.

REFERENCE SIGNS LIST 100 housing
113 measurement unit
131 sub-passage inlet
134 sub-passage
135 circuit chamber
150 sub-passage groove
151 first sub-passage groove
152 second sub-passage groove
300 chip package (resin-sealed package)
301 element (airflow amount measuring element)
302 lead frame
303 sealing resin member
304 polyimide tape
305 DAF
401 element body
402 thin film portion (detection portion)
Kt passage
Th passage wall
ρ curvature radius
β curing contraction rate

The invention claimed is:
1. An airflow amount measuring device comprising a resin-sealed package including
a lead frame,
an airflow amount measuring element mounted on the lead frame and having a detection portion, and a sealing resin member which seals the lead frame and the airflow amount measuring element such that at least the detection portion is exposed, wherein a curvature radius ρ of an exposed portion of the airflow amount measuring element exposed from the sealing resin member is 2.13 mm or less, the sealing resin member has a recessed groove-shaped passage having a pair of passage walls and a bottom wall from which the detection portion is exposed, and the pair of passage walls forming the passage of the resin-sealed package covers both side edges of the airflow amount measuring element, a maximum thickness h3 of the sealing resin member on a sensor element side with respect to the lead frame is twice or more of a maximum thickness h1 of the sealing resin member on a back surface side with respect to the lead frame, in the lead frame, a hole is formed in a region obtained by projecting the detection portion on the lead frame in a direction perpendicular to a front surface of the airflow amount measuring element, and a tape is attached to a back surface side of the lead frame to cover the hole.

2. The airflow amount measuring device according to claim 1, wherein a curing contraction rate ß of the sealing resin member is 0.18% or more.

3. The airflow amount measuring device according to claim 1, wherein the sealing resin member has an opening portion such that a part of the tape is exposed.

4. The airflow amount measuring device according to claim 3, wherein the opening portion has a truncated cone shape of which an opening diameter increases when a distance from the lead frame increases.

5. The airflow amount measuring device according to claim 1, wherein the passage wall has a throttle shape in which an opening area of the passage gradually narrows toward the detection portion.

* * * * *